US010656449B2

(12) United States Patent
Kim et al.

(10) Patent No.: US 10,656,449 B2
(45) Date of Patent: May 19, 2020

(54) DISPLAY DEVICE

(71) Applicant: LG ELECTRONICS INC., Seoul (KR)

(72) Inventors: Junseung Kim, Seoul (KR); Daeseon Ahn, Seoul (KR); Jaehun Lee, Seoul (KR); Kwangho Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/103,561

(22) Filed: Aug. 14, 2018

(65) Prior Publication Data

US 2019/0064579 A1 Feb. 28, 2019

(30) Foreign Application Priority Data

Aug. 22, 2017 (KR) ........................ 10-2017-0106072

(51) Int. Cl.
*G02F 1/1333* (2006.01)

(52) U.S. Cl.
CPC .................. *G02F 1/133308* (2013.01); *G02F 2001/13332* (2013.01); *G02F 2001/133314* (2013.01); *G02F 2001/133317* (2013.01); *G02F 2001/133322* (2013.01); *G02F 2201/46* (2013.01); *G02F 2201/465* (2013.01)

(58) Field of Classification Search
CPC ... G02F 1/133308; G02F 2001/133314; G02F 2001/133317; G02F 2001/13332; G02F 2201/46; G02F 2201/465; G02F 2001/133322; G02F 2001/133325; G02B 6/0091; H05K 5/0017; H05K 5/0217; H05K 5/03; G06F 1/1601
See application file for complete search history.

(56) References Cited

U.S. PATENT DOCUMENTS

| | | | | |
|---|---|---|---|---|
| 4,986,766 A | * | 1/1991 | Leonard ............. | H01R 13/6272 439/352 |
| 5,122,928 A | * | 6/1992 | Lo ........................ | G06F 1/1601 312/7.2 |
| 6,435,896 B1 | * | 8/2002 | Takatsuki ........... | H01R 13/6272 439/354 |

(Continued)

FOREIGN PATENT DOCUMENTS

| | | |
|---|---|---|
| EP | 2172802 | 7/2010 |
| EP | 3098801 | 11/2016 |

(Continued)

OTHER PUBLICATIONS

European Patent Office Application Serial No. 18188925.4, Search Report dated Nov. 30, 2018, 7 pages.

*Primary Examiner* — Abhishek M Rathod
(74) *Attorney, Agent, or Firm* — Lee, Hong, Degerman, Kang & Waimey PC

(57) ABSTRACT

A display device is disclosed. The display device of the present invention comprises: a display panel; a frame being positioned at a rear of the display panel; a guide panel including a receiving portion on which a rear surface of the display panel is received, a guide wall connected to the receiving portion and contacting the frame, and a projection formed on the guide wall; and a back cover positioned behind the frame and engaged with the projection, and wherein the projection has elasticity.

15 Claims, 29 Drawing Sheets

(56) References Cited

U.S. PATENT DOCUMENTS

| | | | |
|---|---|---|---|
| 7,040,905 B1 * | 5/2006 | Wang | H05K 7/1404 361/759 |
| 2013/0114018 A1 * | 5/2013 | Kim | G02F 1/133308 349/58 |
| 2014/0002969 A1 * | 1/2014 | Hwang | H05K 5/0017 361/679.01 |
| 2014/0192290 A1 * | 7/2014 | Mori | G02F 1/133308 349/58 |
| 2015/0181656 A1 * | 6/2015 | Bang | G02F 1/133308 313/512 |
| 2015/0208523 A1 * | 7/2015 | Lee | H05K 5/02 361/679.01 |
| 2016/0147108 A1 | 5/2016 | Takemoto | |
| 2017/0010499 A1 * | 1/2017 | Kang | G09F 9/00 |

FOREIGN PATENT DOCUMENTS

| | | | |
|---|---|---|---|
| WO | 2013032287 | 3/2013 | |
| WO | WO-2015111874 A1 * | 7/2015 | G09F 9/00 |

* cited by examiner

DISPLAY DEVICE

Pursuant to 35 U.S.C. § 119(a), this application claims the benefit of earlier filing date and right of priority to Korean Patent Application No. 10-2017-0106072, filed on Aug. 22, 2017, the contents of which are hereby incorporated by reference herein in its entirety.

BACKGROUND OF THE INVENTION

Field of the Invention

The present invention relates to a display device.

Discussion of the Related Art

With the development of the information society, various demands for display devices have been increasing. Various display devices, such as, e.g., liquid crystal displays (LCDs), plasma display panels (PDPs), electroluminescent displays (ELDs), and vacuum fluorescent displays (VFDs), have been studied and used to meet various demands for the display devices.

Among the display devices, a liquid crystal display panel of the liquid crystal display includes a liquid crystal layer, and a thin film transistor (TFT) substrate and a color filter substrate which are positioned opposite each other with the liquid crystal layer interposed therebetween. The liquid crystal display panel displays an image using light provided by a backlight unit of the liquid crystal display.

Recently, studies have been actively made to improve the assembling structure of a display device while securing the rigidity of the display device.

SUMMARY OF THE INVENTION

Accordingly, an object of the present invention is to address the above-described and other problems.

Another object of the present invention is to provide the display device capable of improving a restriction of structural design of the display device.

Another object of the present invention is to provide the display device capable of improving the deformation of the back cover which can be occurred in the assembling/dissembling process of the display device.

Another object of the present invention is to provide the display device capable of improving efficiency of the assembling process of the display device.

Another object of the present invention is to provide the display device capable of improving defects due to screw-thread wear which can be occurred in screwing of a display device.

In one aspect of the present disclosure, there is provided a display device comprising a display panel, a display panel, a frame being positioned at a rear of the display panel, a guide panel including a receiving portion on which a rear surface of the display panel is received, a guide wall connected to the receiving portion and contacting the frame, and a projection formed on the guide wall and a back cover positioned behind the frame and engaged with the projection, and wherein the projection has elasticity.

According to another aspect of the present disclosure, the display device may comprise a coupling unit being positioned at the vertical portion.

According to another aspect of the present disclosure, the coupling unit may include a plurality of slits being formed on the guide wall, the plurality of slits being opposite one another, an elastic portion being positioned between the plurality of slits, a side of the elastic portion being connected to the guide wall, and a pressing portion being formed on another side of the elastic portion.

According to another aspect of the present disclosure, the projection may be positioned between the elastic portion and the pressing portion.

According to another aspect of the present disclosure, the plurality of slits may surround the pressing portion, and each of the plurality of slits may be connected to one another.

According to another aspect of the present disclosure, the projection may include a guide surface being inclined with respect to the pressing portion, and an engagement surface being positioned between the guide surface and the pressing portion, the engagement surface being extended from the guide surface to the pressing portion.

According to another aspect of the present disclosure, the back cover may include a back plate facing a rear surface of the frame, a sidewall being bent and extended from the back plate toward the display panel, the sidewall covering the guide wall of the guide panel, and a hooking portion may be bent and extended from the sidewall toward the pressing portion, the hooking portion being engaged with the engagement surface of the coupling unit.

According to another aspect of the present disclosure, the coupling unit may further include a rib being positioned adjacent to at least one of the plurality of slits, wherein the rib protrudes at the guide wall of the guide panel.

According to another aspect of the present disclosure, a height of the rib may be smaller than a height of the projection of the coupling unit.

According to another aspect of the present disclosure, the rib may include a plurality of ribs, and each of the plurality of ribs may be positioned adjacent to each of the plurality of slits.

According to another aspect of the present disclosure, the pressing portion may be convex toward the hooking portion of the back cover.

According to another aspect of the present disclosure, an arch portion may be formed at an end of at least one of the plurality of slits.

According to another aspect of the present disclosure, the guide panel may include a first long side, a second long side being opposite to the first long side, a first short side being connected to an end of the first long side, the first short side being connected to an end of the second long side, and a second short side being opposite to the first short side, the second short side being connected to another end of the first long side, the second short side being connected to another end of the second long side.

According to another aspect of the present disclosure, the coupling unit may be positioned on the first short side, and the guide panel may include a fixing protrusion positioned n the first long side.

According to another aspect of the present disclosure, the coupling unit may be positioned adjacent to a first corner.

According to another aspect of the present disclosure, the first long side may be connected to the first short side at the first corner, and the fixing protrusion may be positioned adjacent to the first corner, and a distance from the fixing protrusion to the first corner may be smaller than a distance from the coupling unit to the first corner.

According to another aspect of the present disclosure, the back cover may contain a metal.

According to another aspect of the present disclosure, the display device may further comprise a front cover which covers an edge of the display panel.

According to another aspect of the present disclosure, the front cover may include a first part covering an edge of a front surface of the display panel, the front part being supported by the guide wall of the guide panel, a second part being bent and extended from the first part, the second part covering the outer surface of the guide wall of the guide panel, the second part being spaced apart from the guide wall of the guide panel, a third part being extended from the second part toward the guide wall of the guide panel, and a fourth part being extended from the third part, the fourth part facing the guide wall of the guide panel.

According to another aspect of the present disclosure, the fourth part may include an opening, and the coupling unit may be fitted in the opening.

According to another aspect of the present disclosure, the back cover may include a back plate facing a rear surface of the frame, a sidewall being bent and extended from the back plate toward the display panel, the sidewall covering the guide wall of the guide panel, and a hooking portion being bent and extended from the sidewall toward the pressing portion, the hooking portion being engaged with the engagement surface of the coupling unit.

According to another aspect of the present disclosure, the hooking portion may face the third part.

According to another aspect of the present disclosure, the front cover and the guide panel may be screw-fastened to the frame.

According to at least one of embodiments of the present invention, a restriction of structural design of the display device can be improved.

According to at least one of embodiments of the present invention, the deformation of the back cover which can be occurred in the assembling/dissembling process of the display device, can be improved.

According to at least one of embodiments of the present invention, efficiency of the assembling process of the display device, can be improved.

According to at least one of embodiments of the present invention, defects due to screw-thread wear which can be occurred in screwing of a display device, can be improved.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
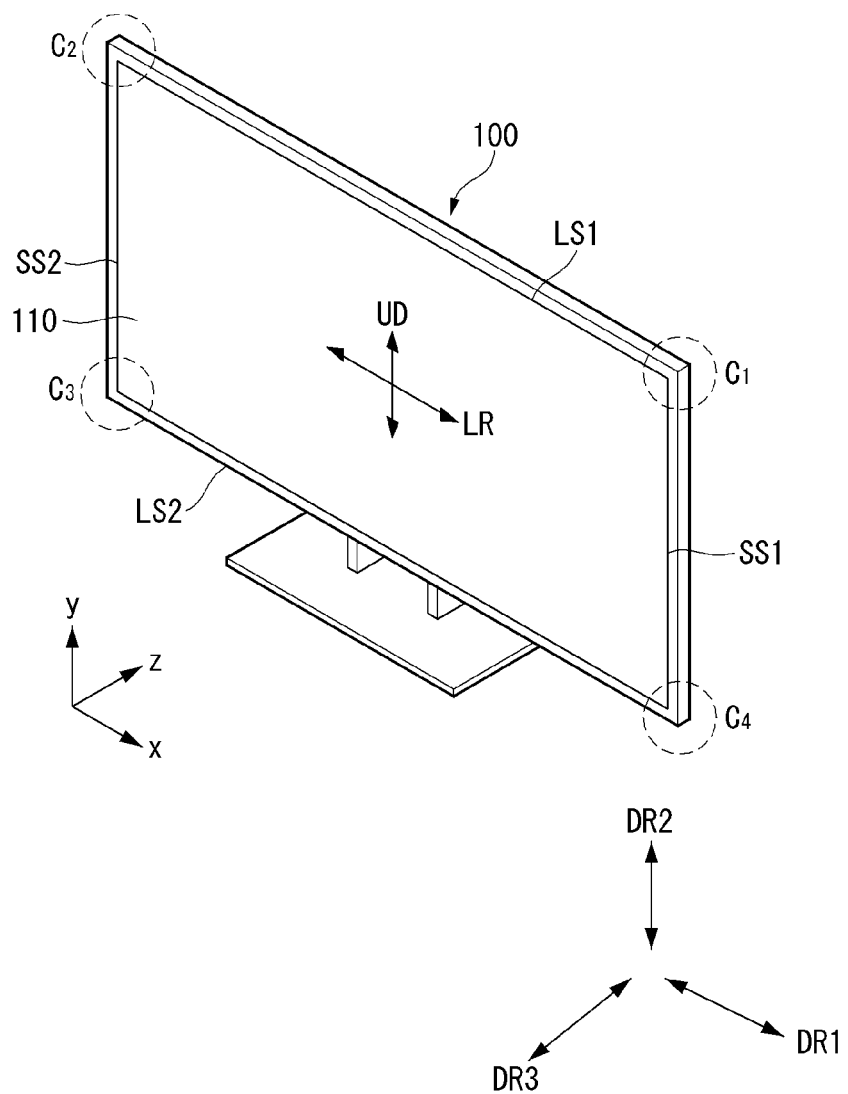
FIGS. 1 to 11 are views illustrating examples of the display device related to the present invention.

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression can include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

Hereinafter, a liquid crystal display device (LCD) will be described as an example of the display panel, but the display panel applicable to the present invention may not be limited to the liquid crystal panel.

Referring to FIG. 1, the display device 100 may include a first long side LS1 and a second long side LS2 opposite to the first long side LS1. The display device 100 may include a first short side SS1 and a second short side SS2 opposite to the first short side SS1. The first short side SS1 may be adjacent to both the first long side LS1 and the second long side LS2.

An area adjacent to the first short side SS1 may be referred to as a first short side area SS1. An area adjacent to the second short side SS2 may be referred to as a second short side area SS2. An area adjacent to the first long side LS1 may be referred to as a first long side area LS1. An area adjacent to the second long side LS2 may be referred to as a second long side area LS2. The first short side area SS1 may be referred to as a first side area. The second short side area SS2 may be referred to as a second side area. The first long side area LS1 may be referred to as a third side area. The second long side area LS2 may be referred to as a fourth side area.

The lengths of the first and second long sides LS1 and LS2 may be longer than the lengths of the first and second short sides SS1 and SS2 for the convenience of explanation. It is also possible that the lengths of the first and second long sides LS1 and LS2 are substantially equal to the lengths of the first and second short sides SS1 and SS2.

The display device 100 may include a display panel 110 for displaying an image. The display panel 110 may form a front surface of the display device 100. The display panel 110 can display an image toward the front of the display device 100. The first direction DR1 may be a direction along to the long sides LS1 and LS2 of the display device 100. The second direction DR2 may be a direction along to the short sides SS1 and SS2 of the display device 100. The third direction DR3 may be a direction normal to the first direction DR1 and/or the second direction DR2.

The first direction DR1 and the second direction DR2 may collectively be referred to as a horizontal direction. In addition, the third direction DR3 may be referred to as a vertical direction.

A side on which the display device 100 displays the image may be referred to as a 'forward direction' or a 'front side' of the display device 100. A side on which the image cannot be viewed may be referred to as a 'rearward direction' or a 'rear side' of the display device 100. From the viewpoint of the front side of the display device 100, the first long side LS1 may be referred to as an upper side or an upper surface, the second long side LS2 side may be referred to as a lower side or a lower surface, the first short side SS1 may be referred to as a right side or the right surface, and the second short side SS2 may be referred to as a left side or a left surface.

The first long side LS1, the second long side LS2, the first short side SS1 and the second short side SS2 may be referred to as an edge of the display device 100. The area where the first long side LS1, the second long side LS2, the first short side SS1, and the second short side SS2 meet with each other may be referred to as a corner. For example, the area where the first long side LS1 and the first short side SS1 meet may be referred to as a first corner C1. The area where the first long side LS1 and the second short side SS2 meet may be referred to as a second corner C2. The area where the second short side SS2 and the second long side LS2 meet may be referred to as a third corner C3. The area where the second long side LS2 and the first short side SS1 meet may be referred to as a fourth corner C4.

The direction from the first short side SS1 to the second short side SS2 or the direction from the second short side SS2 to the first short side SS1 may be referred to as the left and right direction LR. The direction from the first long side LS1 to the second long side LS2 or the direction from the second long side LS2 to the first long side LS1 may be referred to as the up and down direction UD.

Figure 2:
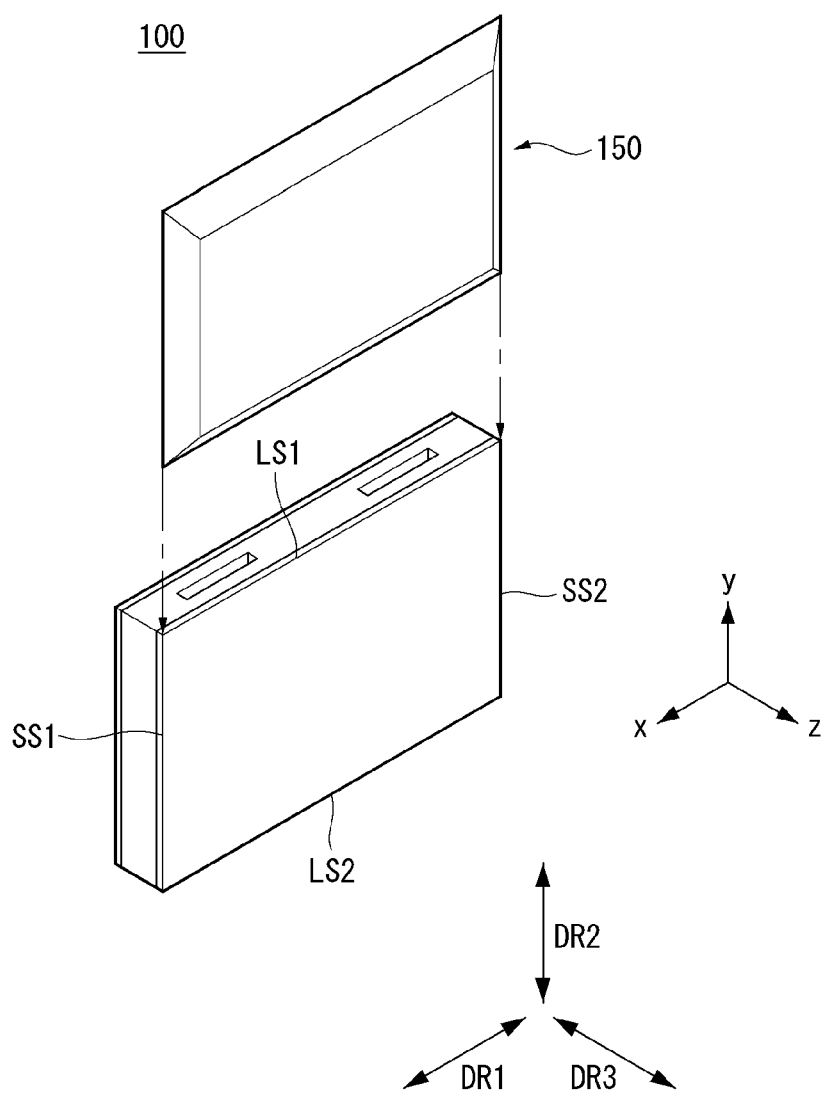

Referring to FIGS. 1 and 2, the back cover 150 may be coupled to the display panel 110. In order for the back cover 150 to be coupled with the display panel 110, the back cover 150 and/or other structures adjacent thereto may include protrusions, sliding portions, engaging portions, and the like.

Figure 3:
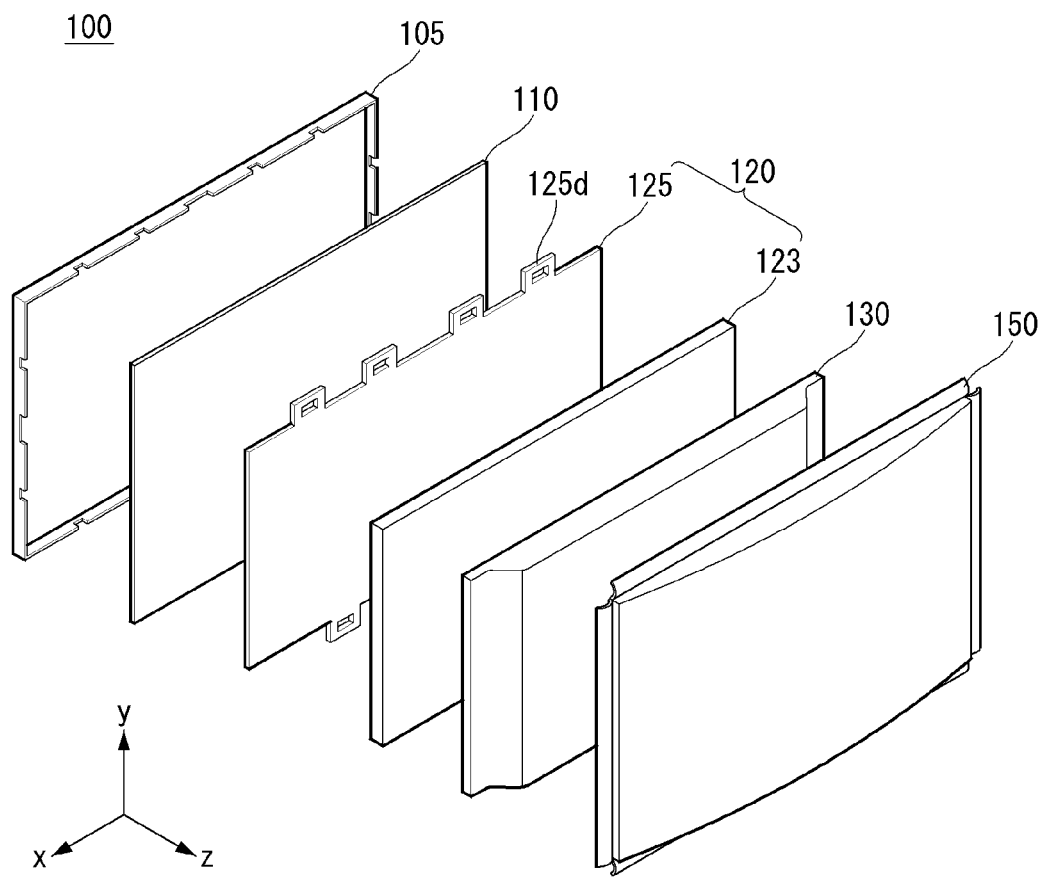

Referring to FIG. 3, the front cover 105 may cover at least a part of the front surface and the lateral surface of the display panel 110. The front cover 105 can be divided into a front side cover positioned on the front side of the display panel 110 and a lateral side cover positioned on the lateral side of the display panel 110. The front side cover and the lateral side cover may be separately formed. One of the front side cover or the lateral side cover may be omitted.

The display panel 110 can be positioned at a front portion of the display device 100 and can display an image. The display panel 110 can display an image by outputting RGB (red, green or blue) for each pixel by a plurality of pixels on timing. The display panel 110 may be divided into an active area on which an image is displayed and a de-active area on which an image is not displayed. The display panel 110 may include a front substrate and a rear substrate facing the front substrate. A liquid crystal layer may be positioned between the front and rear substrates.

The front substrate may include a plurality of pixels made up of red (R), green (G), and blue (B) sub-pixels. The front substrate can emit light corresponding to the color of red, green, or blue according to a control signal.

The back substrate may include switching elements. The rear substrate can switch the pixel electrodes. For example, the pixel electrode can change the molecular arrangement of the liquid crystal layer according to a control signal applied from the outside. The liquid crystal layer may include liquid crystal molecules. The liquid crystal molecules can change the arrangement in accordance with the voltage difference generated between the pixel electrode and the common electrode. The liquid crystal layer may transmit or block the light provided from the backlight unit 120 to the front substrate.

The backlight unit 120 may be positioned at the rear of the display panel 110. The backlight unit 120 may include light sources. The backlight unit 120 may be coupled to the frame 130 in front of the frame 130.

The backlight unit 120 may be driven in a whole driving manner or a partial driving manner such as local dimming, impulsive, or the like. The backlight unit 120 may include an optical sheet 125 and an optical assembly 123.

The optical sheet 125 may transmit light of the light source to the display panel 110 uniformly. The optical sheet 125 may be composed of layers. For example, the optical sheet 125 may include a prism sheet, a diffusion sheet, and the like.

The optical sheet 125 may have a coupling portion 125d. The coupling portion 125d may be coupled to the front cover 105, the frame 130, and/or the back cover 150. Alternatively, the coupling portion 125d may be fastened to a structure which is formed or coupled on the front cover 105, the frame 130, and/or the back cover 150.

The optical assembly may be positioned at a rear of the optical sheet 125. The optical assembly 123 may provide the optical sheet 125 with light. The optical assembly can include a light source.

The frame 130 may support components of the display device 100. For example, a configuration such as the backlight unit 120 or the like may be coupled to the frame 130. The frame 130 may be made of a metal such as an aluminum alloy.

The back cover 150 may be located at the rear portion of the display device 100. The back cover 150 may be coupled to the frame 130 and/or the front cover 105. For example, the back cover 150 may be an injection-molded material of a resin.

Figure 4:
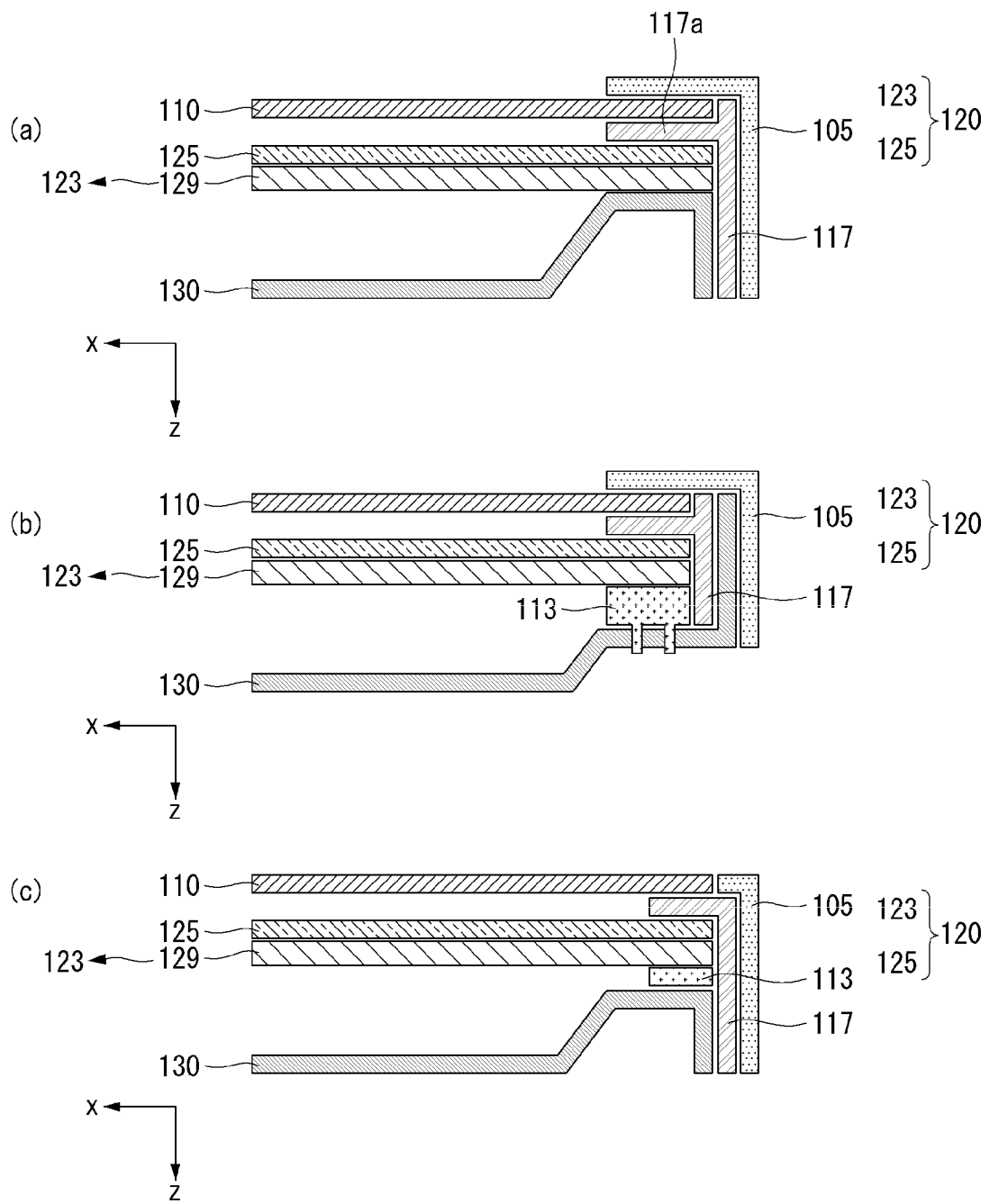

Referring to FIG. 4(a), the backlight unit 120 can be positioned at a front of the frame 130. The backlight unit 120 may include the optical assembly 123 and the optical sheet 125. The optical assembly may be positioned between the optical sheet 125 and the frame 130. The optical assembly 123 may include a diffusion plate 129.

The optical sheet 125 and/or the diffusion plate 129 can be coupled to the frame 130 at the edge of the frame 130. The optical sheet 125 and/or the diffusion plate 129 can be seated on the edge of the frame 130. The optical sheet 125 and/or the diffusion plate 129 can be supported by the frame 130. The edge surface of the optical sheet 125 can be covered by a first guide panel 117. For example, the optical sheet 125 and/or the diffusion plate 129 may be positioned between the edge of the frame 130 and the flange 117a of the first guide panel 117.

The display panel 110 can be positioned in front of the optical sheet 125. The edge of the display panel 110 may be supported by the first guide panel 117. An edge area of the front surface of the display panel 110 may be covered by the front cover 105. A part of the display panel 110 can be positioned between the first guide panel 117 and the front cover 105.

Referring to FIG. 4(b), the optical sheet 125 can be coupled to the second guide panel 113. That is, the second guide panel 113 may be coupled to the frame 130, and the optical sheet 125 may be coupled to the second guide panel 113. The second guide panel 113 may be made of a material different from the frame 130. The frame 130 may be configured to enclose the first and second guide panels 117 and 113 or to contain first and second guide panels 117 and 113. The first or second guide panel 117 or 113 may be referred to as a holder or a support member.

Referring to FIG. 4(c), the front cover 105 may not cover the front surface of the display panel 110. The front cover 105 may be positioned on the lateral side of the display panel 110.

Figure 5:
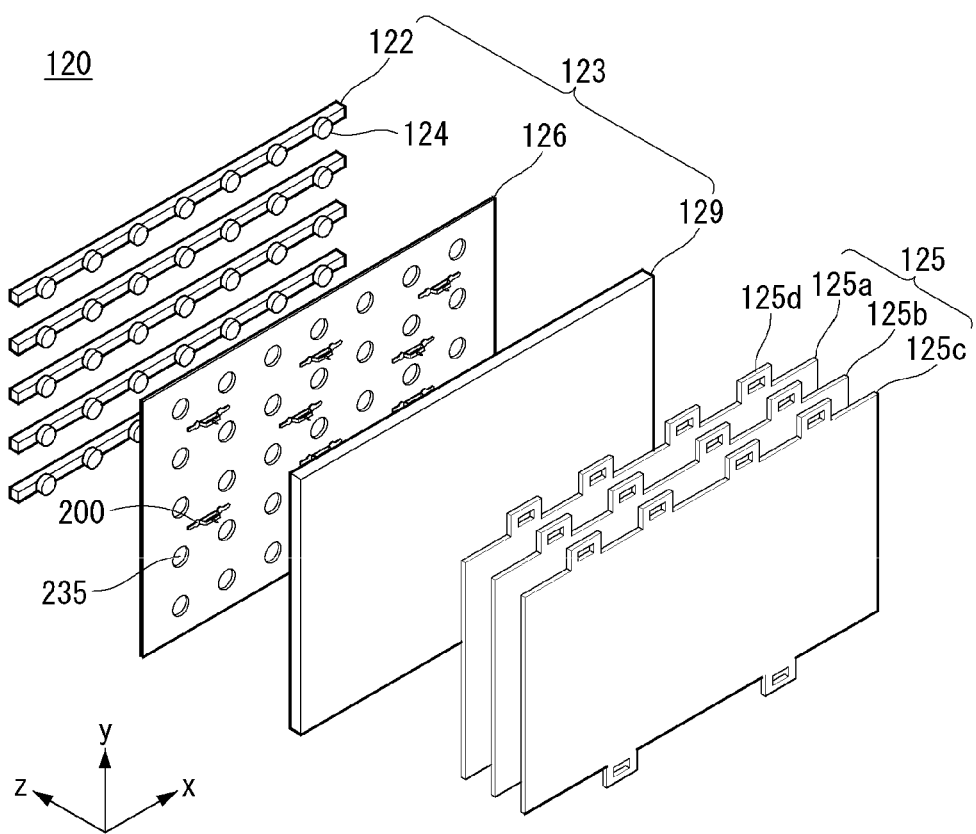

Referring to FIG. 5, the backlight unit 120 may include the optical assembly 123 and the optical sheet 125. The optical sheet 125 can be positioned in front of the optical assembly 123.

The optical assembly 123 may include a substrate 122, at least one optical module 124, a reflective sheet 126, and a diffusion plate 129.

The substrate 122 may have a plurality of straps extending in a first direction and spaced apart from each other by a certain distance in a second direction normal to the first direction.

At least one optical module 124 may be mounted on the substrate 122. An electrode pattern for connecting the adapter to the optical module 124 may be formed on the substrate 122. For example, a carbon nanotube electrode pattern for connecting the optical module 124 to the adapter may be formed on the substrate 122.

The substrate 122 may be composed of at least one of polyethylene terephthalate (PET), glass, polycarbonate (PC), and silicon. The substrate 122 may be a printed circuit board (PCB) on which at least one optical module 124 is mounted.

The optical modules 124 may be disposed on the substrate 122 with certain spacing in the first direction. The diameter of the optical module 124 may be greater than the width of the substrate 122. The diameter of the optical module 124 may be greater than the length of the substrate 122 in the second direction.

The optical module 124 may be a light emitting diode (LED) package. The module assembly 124 may include at least one light emitting diode chip.

The optical module 124 may be comprised of a white LED or a colored LED (which emits at least one of the colors, such as red, blue, green, and the like). The colored LED may include at least one of a red LED, a blue LED, and a green LED.

A reflective sheet 126 may be positioned at the front of the substrate 122. The reflective sheet 126 may have a plurality of through-holes 235. The optical modules 124 may be positioned in the through-holes 235. The through-hole 235 can be referred to as a lens hole 235.

The reflective sheet 126 may reflect the light emitted from the optical module 124 to the front side. Further, the reflective sheet 126 can reflect the light reflected from the diffusion plate 129 again.

The reflective sheet 126 may include at least one of a metal and a metal oxide which are reflective materials. For example, the reflective sheet 126 may include a metal and/or a metal oxide having a high reflectance such as aluminum (Al), silver (Ag), gold (Au), and titanium dioxide (TiO2).

A supporter 200 can be coupled to the reflective sheet 126. The supporter may protrude forward. The supporter 200 can be positioned between the reflective sheet 126 and the diffusion plate 129. The supporter 200 can be positioned between the reflective sheet 126 and the optical sheet 125. The supporter 200 can maintain the spacing between the reflective sheet 126 and the diffusion plate 129 or the spacing between the reflective sheet and the optical sheet 125.

Resins can be deposited on the optical module 124 and/or the reflective sheet 126. The resin may serve to diffuse the light emitted from the optical module 124. The diffusion plate 129 can diffuse the light emitted from the optical module 124 forward.

The diffusion plate 129 may diffuse the light emitted from the optical module 124. The plurality of optical modules 124 may be a point light source. The plurality of optical modules 124 may be arranged. The light provided forward from the plurality of optical modules 124 may have different brightness depending on the distance from the optical module 124. The diffusion plate 129 can uniformize the illumination profile originated from the plurality of optical modules 124.

The optical sheet 125 can be positioned in front of the diffusion plate 129. The rear surface of the optical sheet 125 can be in close contact with the diffusion plate 129. The front surface of the optical sheet 125 can be in close contact with the rear surface of the display panel 110 (see FIG. 1).

The optical sheet 125 may include at least one sheet. In detail, the optical sheet 125 may include one or more prism sheets and/or one or more diffusion sheets. The plurality of sheets of the optical sheet 125 may be in an adhered state and/or tightly contact state.

The optical sheet 125 may be composed of a plurality of sheets having different functions. For example, the optical sheet 125 may include first to third optical sheets 125a to 125c. For example, the first optical sheet 125a may be a diffusion sheet, and the second and third optical sheets 125b and 125c may be a prism sheet. The number and/or position of the diffusion sheet and the prism sheet can be changed.

The diffusion sheet can prevent the light from the diffusion plate 129 from being partially concentrated, thereby can make the distribution of light more uniform. The prism sheet can collect light from the diffusion sheet to provide light to the display panel 110.

The coupling portion 125d may be formed on at least one of the sides or edges of the optical sheet 125. The coupling portion 125d may be formed on at least one of the first to third optical sheets 125a to 125c.

The coupling portion 125d may be formed at the long side of the optical sheet 125. The first long side of the optical sheet 125 may be opposite to the second long side of the optical sheet 125. The coupling portion 125d formed on the first long side and the coupling portion 125d formed on the second long side may be asymmetric. For example, the position and/or number of the coupling portion 125d at the first long side may different from the position and/or number of the coupling portion 125d at the second long side.

Figure 6:
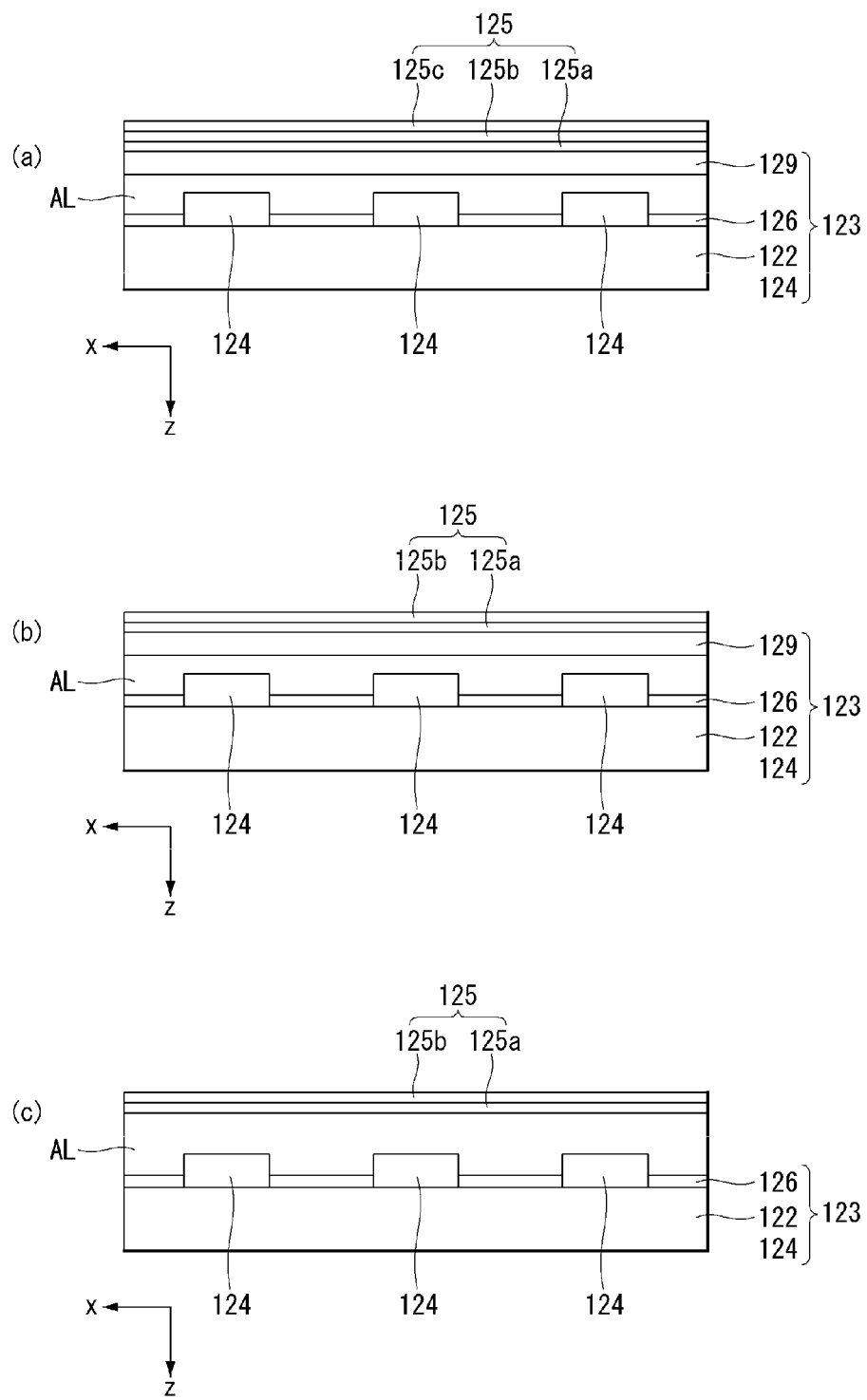

Referring to FIG. 6(a), the optical module 124 may be disposed on the front surface of the substrate 122. Each of the plurality of optical modules 124 may be spaced apart from one another. The plurality of optical modules 124 may provide light forward.

The reflective sheet 126 may be disposed on the front surface of the substrate 122. The optical module 124 can be inserted in the reflective sheets 126.

The diffusion plate 129 may be positioned in front of the optical module 124. The diffusion plate 129 may be positioned in front of the reflective sheet 126. The diffusion plate 129 may be disposed apart from the optical module 124. The diffusion plate 129 may be disposed apart from the reflection sheet 126.

The air layer AL may be formed between the diffusion plate 129 and the optical module 124. The air layer AL may be formed between the diffusion plate 129 and the reflective sheet 126. The air layer AL may comprise a stable gas. For example, the air layer AL may comprise a gas which is the same as or similar to the composition of the air. For example, the air layer AL may comprise nitrogen or/and oxygen.

The optical sheet 125 may be disposed on the entire surface of the diffusion plate 129. The optical sheet 125 may include first to third optical sheets 125a, 125b, and 125c. The first optical sheet 125a may be positioned on the front surface of the diffusion plate 129. The second optical sheet 125b may be positioned on the front surface of the first optical sheet 125a. And the third optical sheet 125c may be positioned on the front surface of the second optical sheet 125b.

Referring to FIG. 6(b), the optical sheet 125 may include a first optical sheet 125a and a second optical sheet 125b. The first optical sheet 125a may be a diffusion sheet. The second optical sheet 125b may be a prism sheet.

Referring to FIG. 6(c), the optical sheet 125 may be positioned in front of the optical module 124. The optical sheet 125 may be positioned in front of the reflective sheet 126. The optical sheet 125 may include a first optical sheet 125a and a second optical sheet 125b. The first optical sheet 125a may be a diffusion sheet. The second optical sheet 125b may be a prism sheet.

The air layer AL may be formed between the optical sheet 125 and the reflective sheet 126. The air layer AL may be formed between the optical sheet 125 and the optical module 124.

Figure 7:
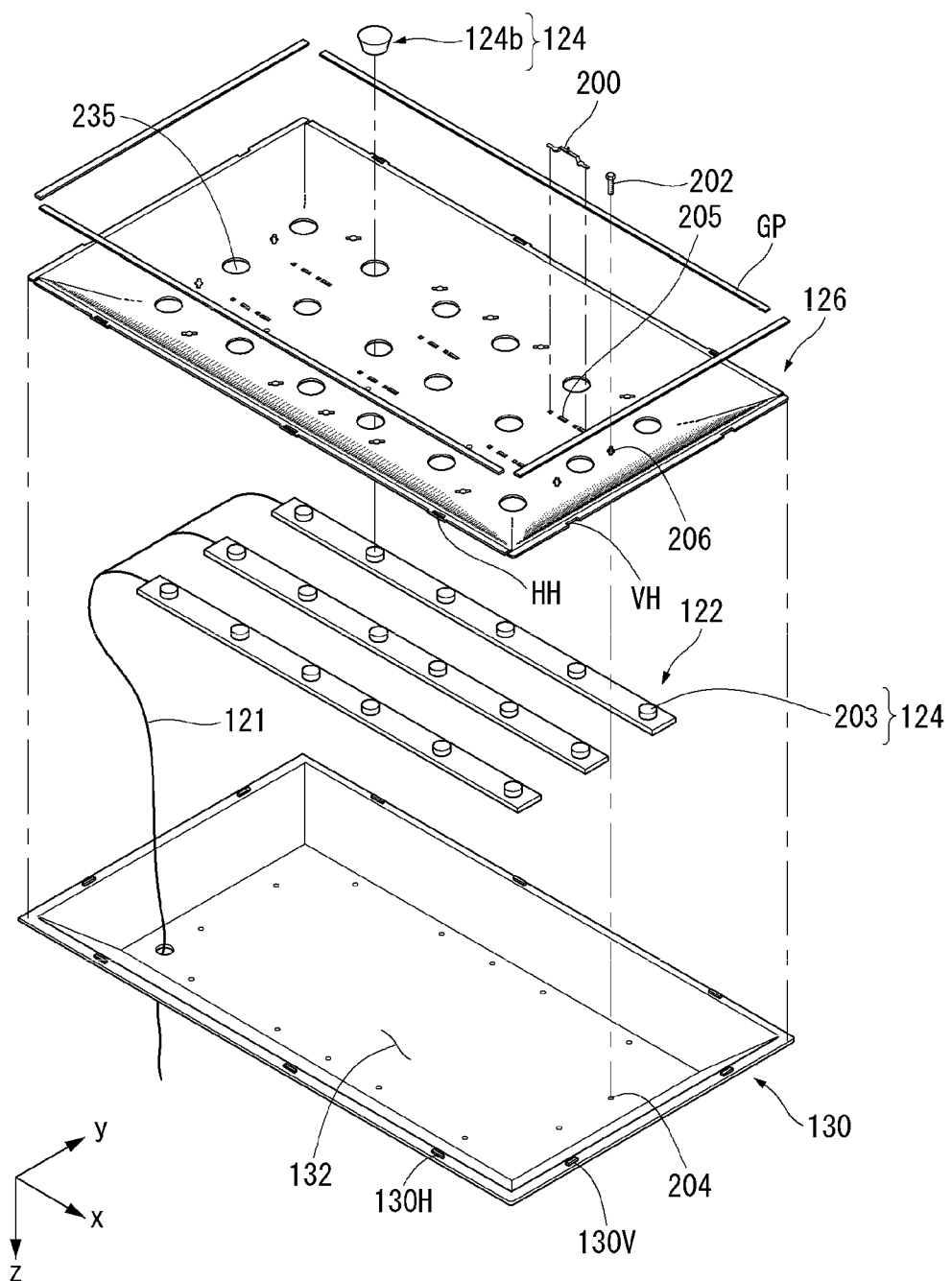

Referring to FIG. 7, the reflective sheet 126 may be coupled to the frame 130. For example, the reflective sheet 126 may be coupled to a seating portion 132 formed on the inside of the frame 130. The reflective sheet 126 may have a steric shape corresponding to the shape of the seating portion 132.

The reflective sheet 126 may include a horizontal holder HH and/or a vertical holder VH. The horizontal holder HH and/or the vertical holder VH may have the shape of an opening formed along the side (edge) of the reflective sheet 126.

The horizontal holder HH may be an opening formed along two opposite sides of the reflection sheet 126. The horizontal holder HH may be an opening formed along the long sides of the reflection sheet 126, for example.

The vertical holder VH may be an opening formed along two opposite sides of the reflection sheet 126. The vertical holder VH may be an opening formed along the short sides of the reflection sheet 126, for example.

The frame 130 may include a horizontal protrusion 130H and a vertical protrusion 130V. The horizontal protrusion 130H or the vertical protrusion 130V can be formed along two opposite sides of the frame 130. For example, the horizontal protrusion 130H may be formed along the long sides of the frame 130. For example, the vertical protrusion 130V may be formed along the short sides of the frame 130.

The horizontal protrusion 130H or the vertical protrusion 130V may protrude forward. The horizontal protrusion 130H or the vertical protrusion 130V can be coupled to the reflective sheet 126. For example, the horizontal protrusion 130H can be coupled to the horizontal holder HH of the reflection sheet 126. For example, the vertical protrusion 130V can be coupled to the vertical holder VH of the reflective sheet 126.

The guide panel GP may include an elongated rod shape. The guide panel GP may be disposed on the front surface of the reflective sheet 126. The guide panel GP may be disposed along the edge of the reflective sheet 126. The guide panel GP can be formed by a combination of elongated rods.

The guide panel GP may include plastic. The guide panel GP can be formed by injection. The guide panel GP may include a metal. The guide panel GP can be formed by press.

The substrate 122 may be positioned between the frame 130 and the reflective sheet 126. The optical module 124 may be disposed on the front surface of the substrate 122. The optical module 124 may be located in the lens hole 235 formed at the reflective sheet 126.

The plurality of substrates 122 may be arranged in the horizontal direction and/or the vertical direction. The substrate 122 may be electrically connected to the wire 121. The substrate 122 may be provided with power and/or electrical signals from the wire 121. The wire 121 can be referred to as a signal wire 121 or a signal line 121.

The lens hole 125 at the reflective sheet 126 may be formed corresponding to the light source 203 disposed on the substrate 122. The light source 203 may be located in the lens hole 125. A part of the light source 203 and the substrate 122 may be exposed forward through the lens hole 125. The lens 124b may be located in front of the light source 203. The lens 124b may be coupled to a portion of the substrate 122 exposed frontward through the lens hole 125.

The reflective sheet 126 can form a supporter hole 205. The supporter 200 can be coupled to the supporter hole 205. The supporter 200 can support the diffusion plate 129 (see FIG. 5) and/or the optical sheet 125 (see FIG. 5) located in front of the reflective sheet 126. By the supporter 200, the reflective sheet 126 can be spaced apart from the diffusion plate 129 (see FIG. 5) and/or the optical sheet 125 (see FIG. 5).

The reflective sheet 126 can form a plurality of fixing pin holes 206. The fixing pin 202 can be coupled to the fixing pin hole 206. The fixing pin 202 may be coupled to the frame hole 204 formed at the frame 130. The fixing pin 202 can fasten the reflective sheet 126 to the frame 130.

Figure 8:
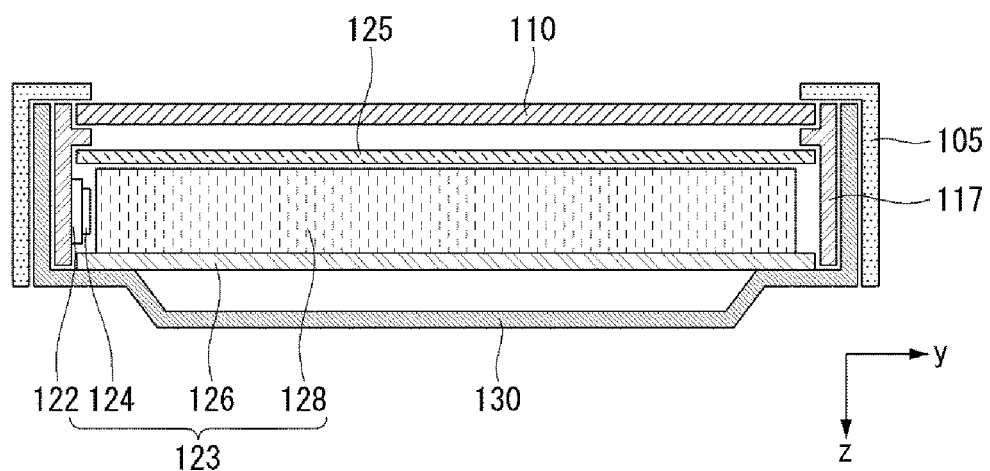

Referring to FIG. 8, the optical assembly 123 may include a substrate 122, a reflective sheet 126, an optical module 124, and a light guide panel 128. The optical assembly 123 may not include some of these elements. The optical assembly 123 can be referred to as a optical layer 123. The light guide panel 128 can be referred to as a light guide plate 128.

The optical layer 123 may be located in front of the frame 130. The optical layer 123 may be positioned between the frame 130 and the display panel 110. The optical layer 123 may be supported by the frame 130. The optical layer 123 can be accommodated in the space which is formed by the frame 130.

The substrate 122 may be located inside the frame 130. The substrate 122 may be coupled to the first guide panel 117. The substrate 122 may be directly coupled to the first guide panel 117. For example, the substrate 122 may be coupled to at least one among the first guide panel 117, the frame 130, and the front cover 105. The front cover 105 may be referred to as a top case 105.

The substrate 124 may be positioned adjacent to the lateral side of the reflective sheet 126 and/or the light guide plate 128. The front surface of the substrate 124 can face the optical layer 123. The substrate 124 and the reflective sheet 126 and/or the light guide plate 128 may be spaced apart from each other.

Figure 9:
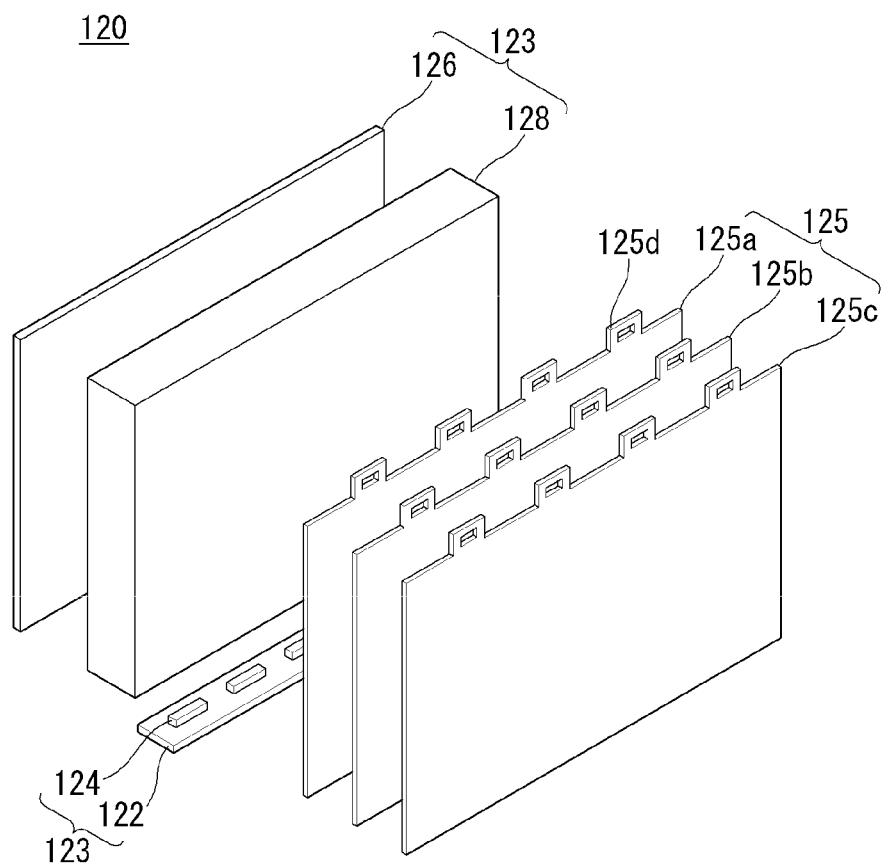
Figure 10:
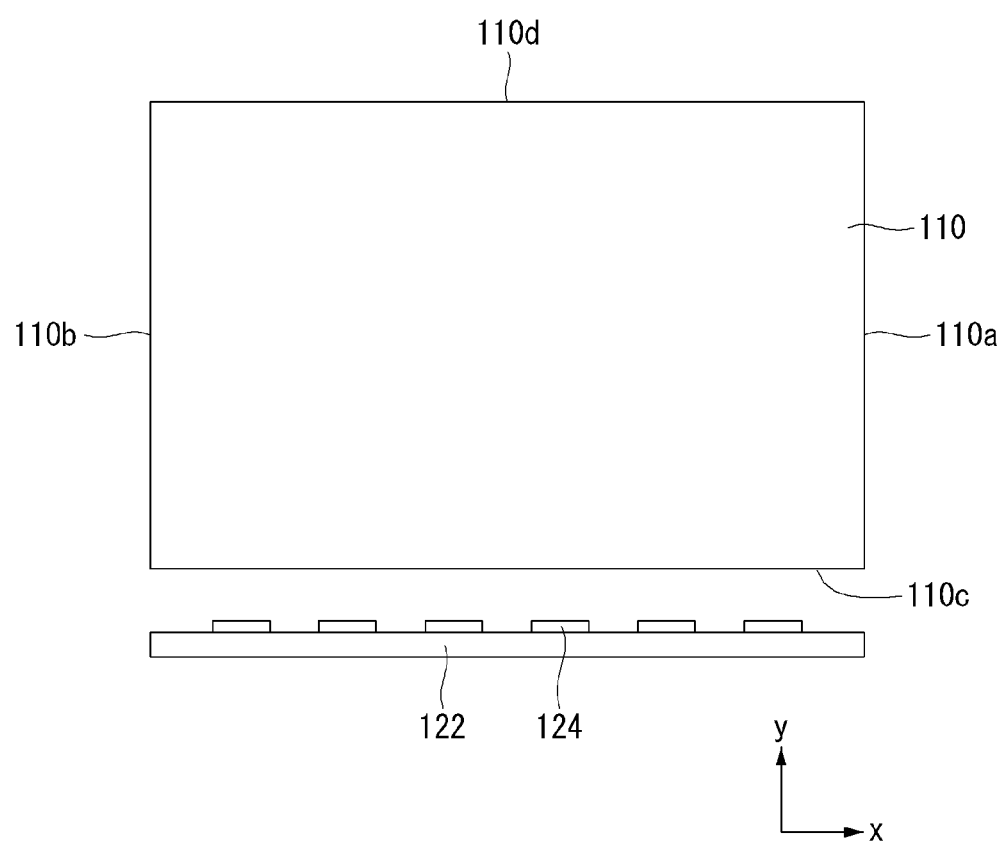

Referring to FIG. 9, the backlight unit 120 may comprise an optical layer 123 and an optical sheet 125 positioned on the front side of the optical layer 123. The optical layer 123 may comprise an substrate 122, at least one optical module 124, a reflective sheet 126, and a light guide panel.

The substrate 122 may be located on a side of the optical layer 123. For example, the substrate 122 may be positioned on a lateral side of the optical layer 123. The substrate 122 may extend in the longitudinal direction of the optical layer 123. The longitudinal direction of the optical layer 123 can be a direction along the long side (edge) of the optical layer 123. The optical modules 124 may be disposed on the substrate 122 with predetermined spacing. Most of light emitted from the optical module 124 can be transmitted to the light guide plate 128.

The reflective sheet 126 may be positioned behind the light guide plate 128. A portion of the light emitted from the optical module 124 can be reflected by the light guide plate 128 and directed toward the reflective sheet 126. The reflective sheet 126 can reflect light incident on the reflective sheet 126 toward the light guide plate 128.

The reflective sheet 126 may comprise at least one among a metal and a metal oxide, which are reflective materials. For example, the reflective sheet 126 can include a metal and/or a metal oxide having a high reflectance such as aluminum (Al), silver (Ag), gold (Au), and titanium dioxide (TiO2).

The reflective sheet 126 may be formed by depositing and/or coating a metal or metal oxide. The reflective sheet 126 may be printed with an ink containing a metal. The reflective sheet 126 may have a vapor deposition layer formed using a thermal evaporation method, an evaporation method, or a sputtering method. The reflective sheet 126 may have a vapor deposition layer formed using a vacuum deposition method. The reflective sheet 126 may be formed with a coating layer and/or a printing layer using a printing method, a gravure coating method, or a silk screen method.

The optical sheet 125 may include one or more prism sheets and/or one or more diffusion sheets. The plurality of sheets of the optical sheet 125 may be in an adhered state and/or tightly attached state.

The optical sheet 125 may be composed of a plurality of sheets having different functions. For example, the optical sheet 125 may include first to third optical sheets 125a to 125c. For example, the first optical sheet 125a may be a diffusion sheet, and the second and third optical sheets 125b and 125c may be a prism sheet. The number and/or position of the diffusion sheet and the prism sheet can be altered.

The diffusion sheet can prevent the light from the diffusion plate 129 from being partially concentrated, thereby can make the distribution of light more uniform. The prism sheet can collect light from the diffusion sheet to provide light to the display panel 110. The light can be incident on the display panel 110 perpendicularly.

The coupling portion 125d may be formed on at least one edge of the optical sheet 125. The coupling portion 125d may be formed on at least one among the first to third optical sheets 125a to 125c.

The coupling portion 125d may be formed at the long side of the optical sheet 125. The first long side of the optical sheet 125 may be opposite to the second long side of the optical sheet 125. The coupling portion 125d formed on the first long side may be asymmetric with the coupling portion 125d formed on the second long side. For example, the position and/or number of the coupling portion 125d at the first long side may different from the position and/or number of the coupling portion 125d at the second long side.

Referring to FIG. 8, the optical assembly 124 may provide light from the lower side 110c to the upper side 110d of the display panel 110. The light provided in the optical assembly 124 may diffuse from the lower side 110c of the display panel 110 to the upper side 110d. The optical assembly 124 may provide light to the entire display panel 110.

Figure 11:
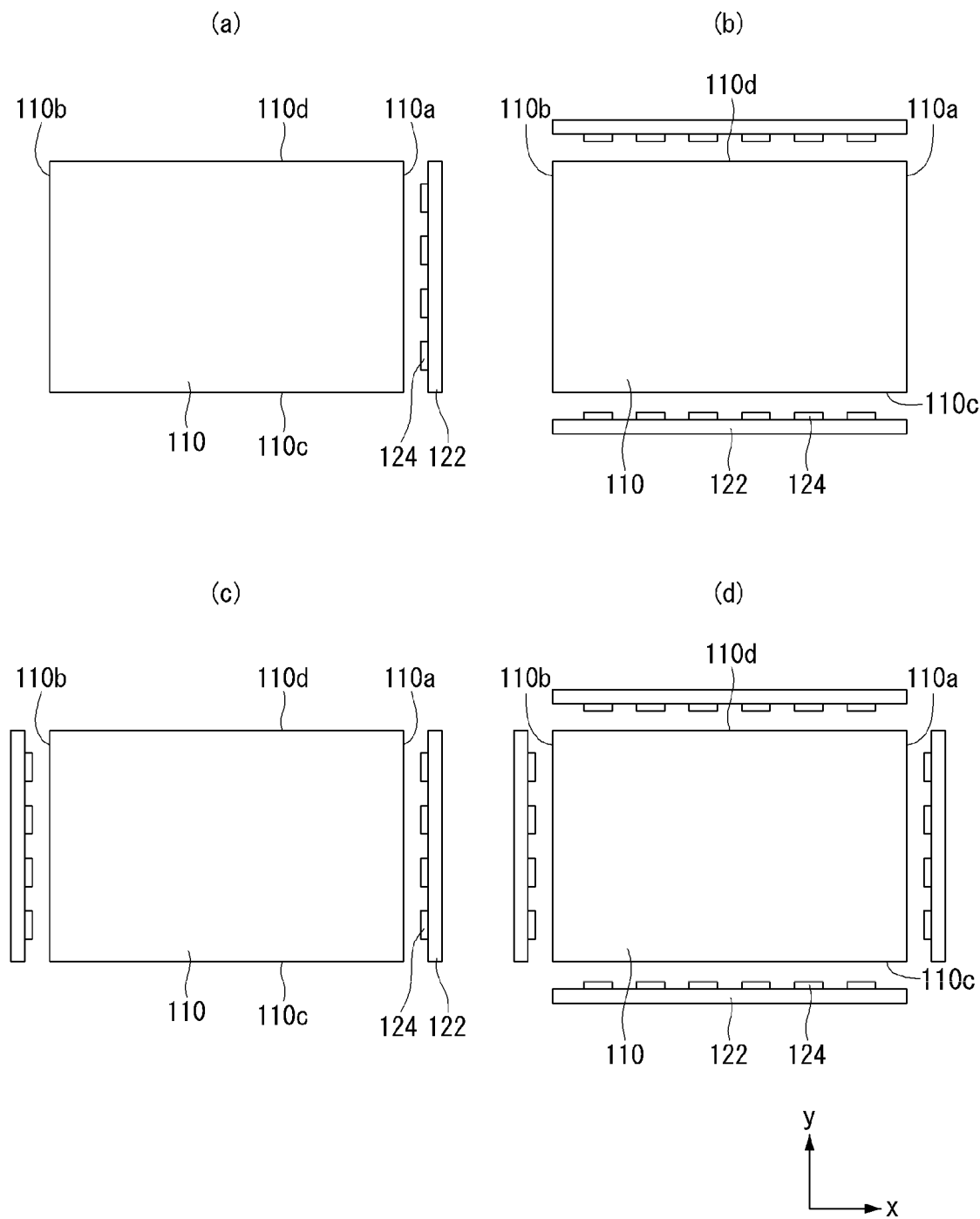

Referring to FIG. 11(a), the optical module 124 may be located on the right side 110a of the display panel 110. In another example, the optical assembly 124 may be located on the left side 110b of the display panel 110.

Referring to FIG. 11(b), the optical module 124 may be located on the lower side 110c and the upper side 110d of the display panel 110. Referring to FIG. 11(c), the optical module 124 may be located on the right side 110a and the left side 110b of the display panel 110. Referring to FIG. 11(d), the optical module 124 may be positioned on four sides of the display panel 110. In case that the optical module 124 is located on four sides of the display panel 110, the light provided in the optical assembly 124 may be more easily diffused.

Figure 12:
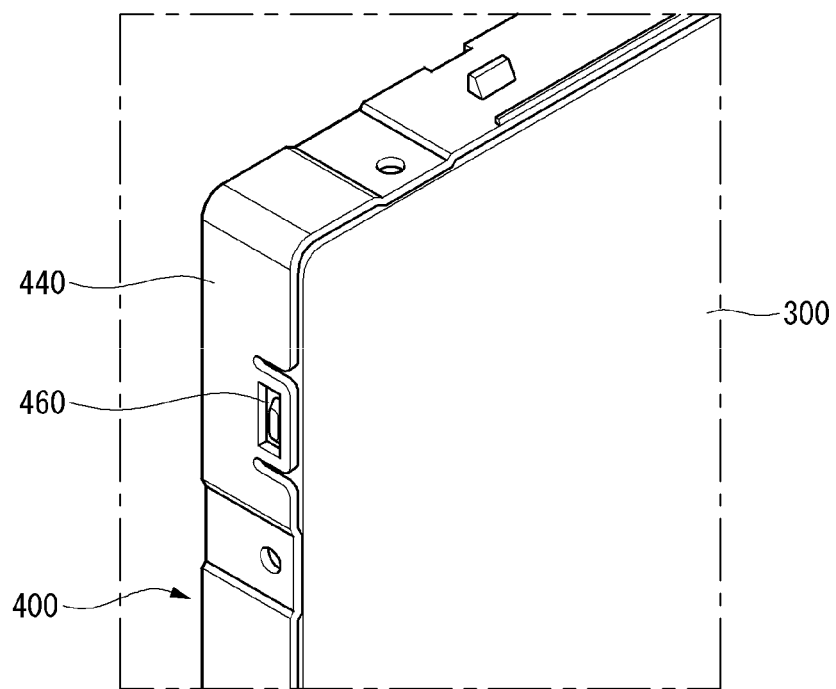
FIGS. 12 to 19 are views illustrating examples of configuration of the display device according to an embodiment of the present invention.
Figure 13:
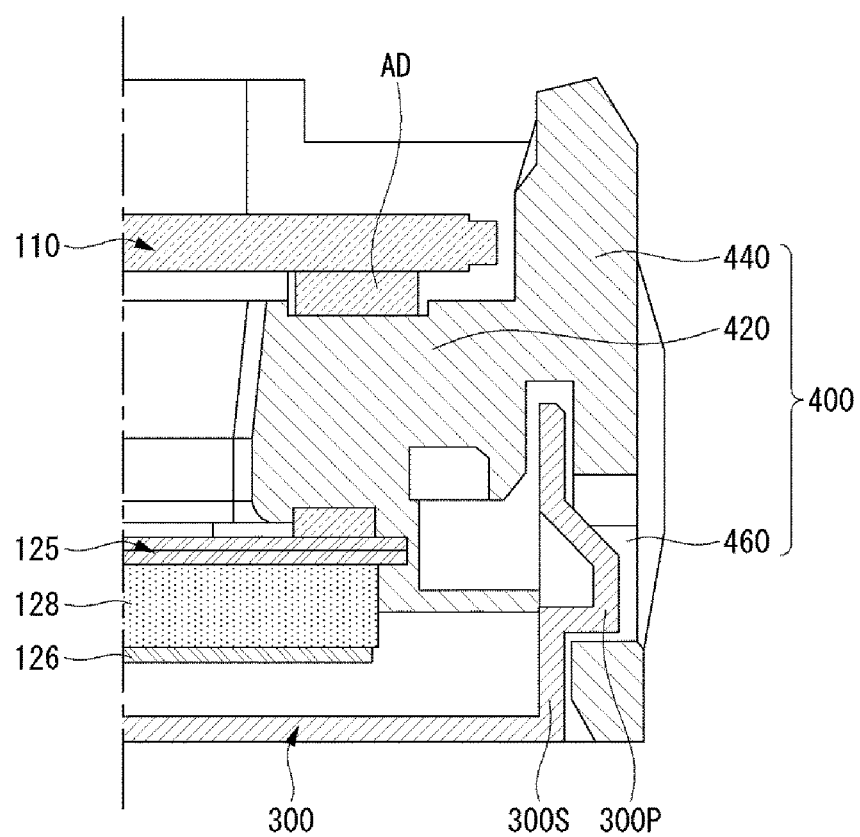

Referring to FIGS. 12 and 13, the guide panel 400 may be coupled to or mounted on the frame 300. The guide panel 400 may cover the lateral side of the frame 300. The guide panel 400 may include a horizontal portion 420 and a vertical portion 440. The horizontal portion 420 can be referred to as a horizontal part 420 or a receiving portion. The vertical portion 440 can be referred to as a vertical part 440 or a guide wall 440.

The horizontal portion 420 may be positioned between the display panel 110 and the frame 300. The rear surface of the display panel 110 may face the horizontal portion 420 or may be placed on the horizontal portion 420. For example the rear surface of an edge portion of the display panel 100 may face the horizontal portion 420 or may be placed on the horizontal portion 420. The display panel 110 can be fixed to the horizontal portion 420 by the adhesive member AD or the fixing member AD. The horizontal portion 420 can be in contact with the optical sheet 125. The optical sheet 125 can be fixed by the horizontal portion 420.

The vertical portion 440 may extend from the horizontal portion 420. For example, the horizontal portion 420 and the vertical portion 440 may form T-shape. The vertical portion 440 may have a slot 460. The sidewall 300S of the frame 300 may be inserted into or coupled to the slot 460. The slot 460 may be a groove 460.

The guide panel 400 may have a groove 460 or a hole 460 and the sidewall 300S of the frame 300 may have a protrusion 300P. The protrusion 300P of the side wall 300S can be inserted into the groove 460 or the hole 460 of the guide panel 400.

Figure 14:
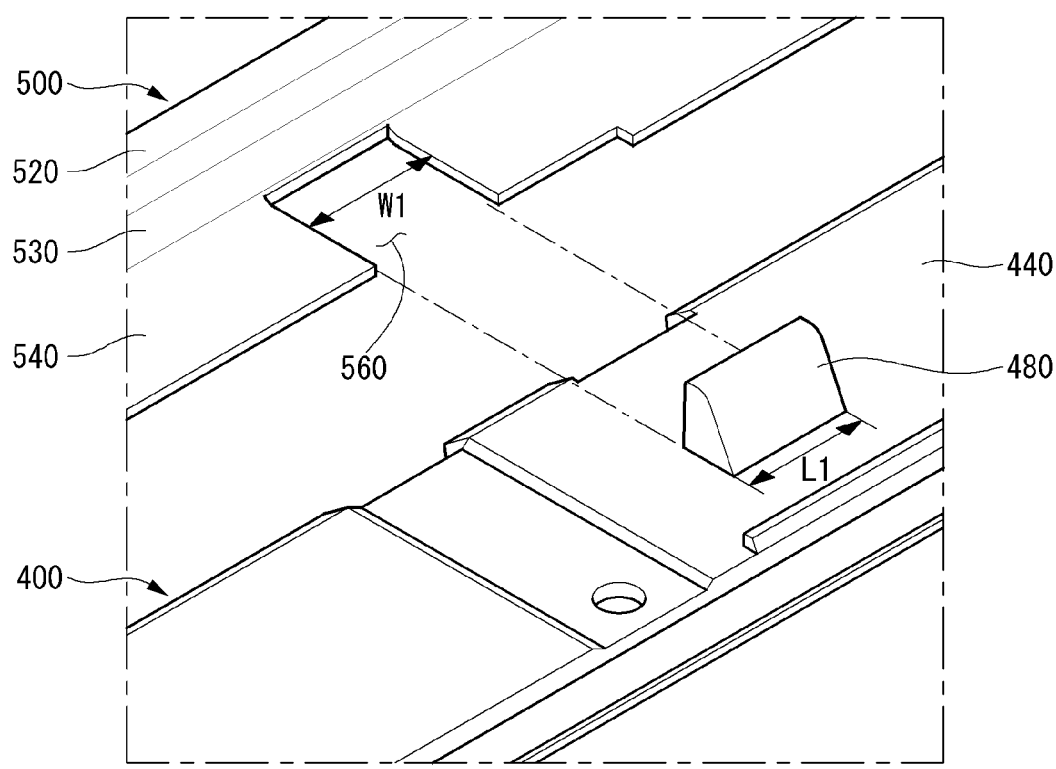
Figure 15:
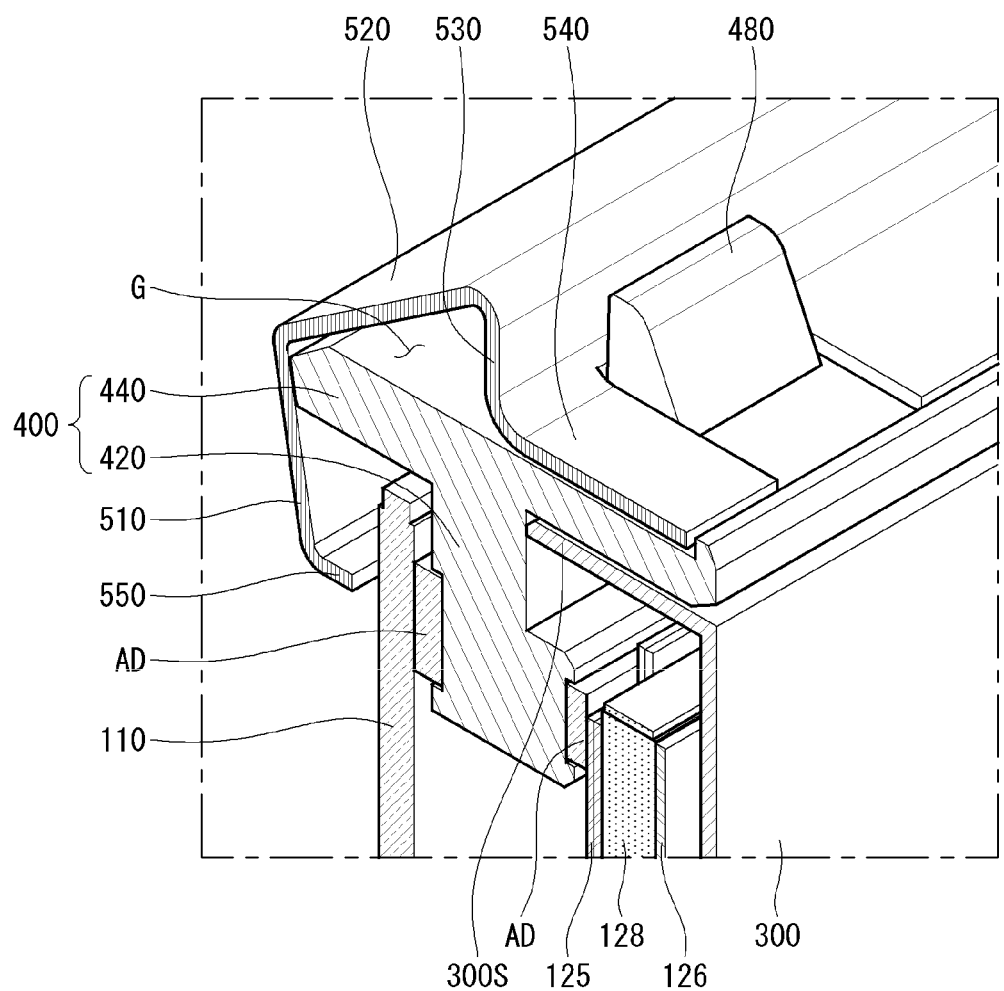

Referring to FIGS. 14 and 15, the front cover 500 may be coupled to the guide panel 400. The front cover 500 may include a first part 510, a second part 520, a third part 530, a fourth part 540, and a fifth part 550.

The first part 510 may be supported by the vertical portion 440 of the guide panel 400. The first part 510 may cover the front surface of the display panel 110 near the edge thereof. The second part 520 may be bent and extended from the first part 510. The second part 520 may cover the outer surface of the vertical portion 440 of the guide panel 400. The second part 520 may be inclined with respect to the vertical portion 440. A space G may be formed between the second part 520 and the vertical portion 440. The space G can be referred to as a gap G. The third part 530 may be bent and extended from the second part 520. The space G can be formed by the second part 520, the third part 530, and the vertical portion 440. The fourth part 540 may be bent and extended from the third part 530. The fourth part 540 may face the vertical portion 440 or in contact with the vertical portion 440. The third part 530 may connect the second part 520 and the fourth part 540. The fifth part 550 may be bent from the first part 510. The fifth part 550 may be extended from the first part 510 toward the display panel 110. The first part 510 may connect the second part 510 to the fifth part 550.

The guide panel 400 may include a fixing protrusion 480. The fixing protrusion 480 may be formed on the vertical portion 440 of the guide panel 400. For example, the fixing protrusions 480 may protrude from the outer surface of the vertical portion 440 of the guide panel 400.

The guide panel 400 may have an opening 560. The opening 560 may be formed on the fourth part 540. The opening 560 can be recessed toward the third part 530. The fixing protrusion 480 of the guide panel 400 may be inserted into the opening 560 of the fourth part 540. The width W1 of the opening 560 may correspond to the left and right length L1 of the fixing protrusion 480.

Figure 16:
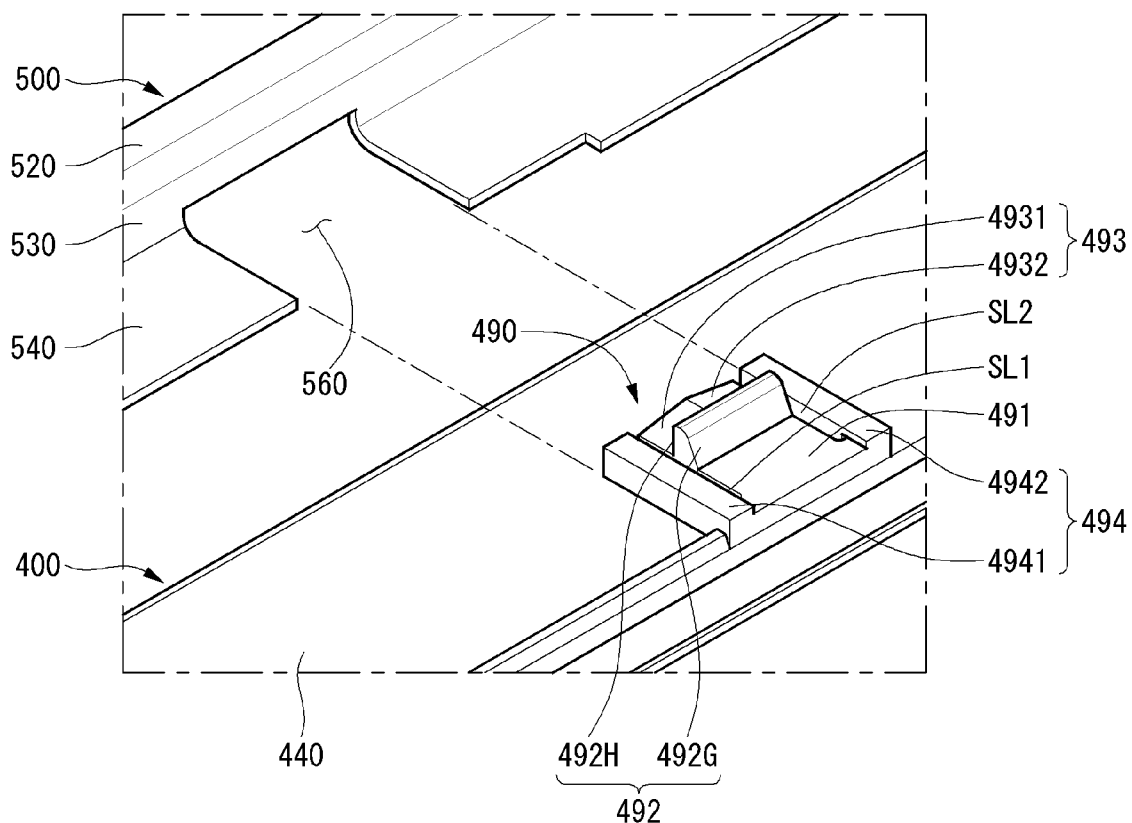
Figure 17:
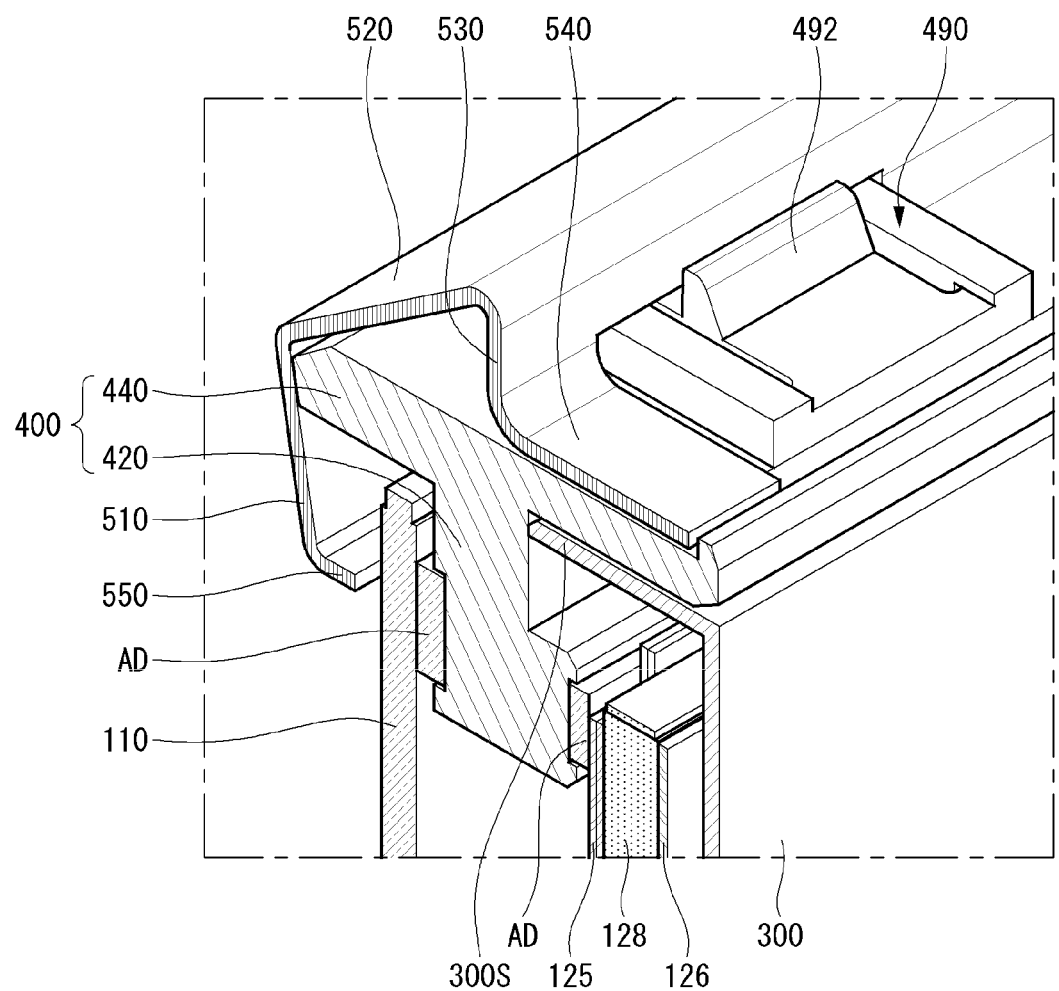
Figure 23:
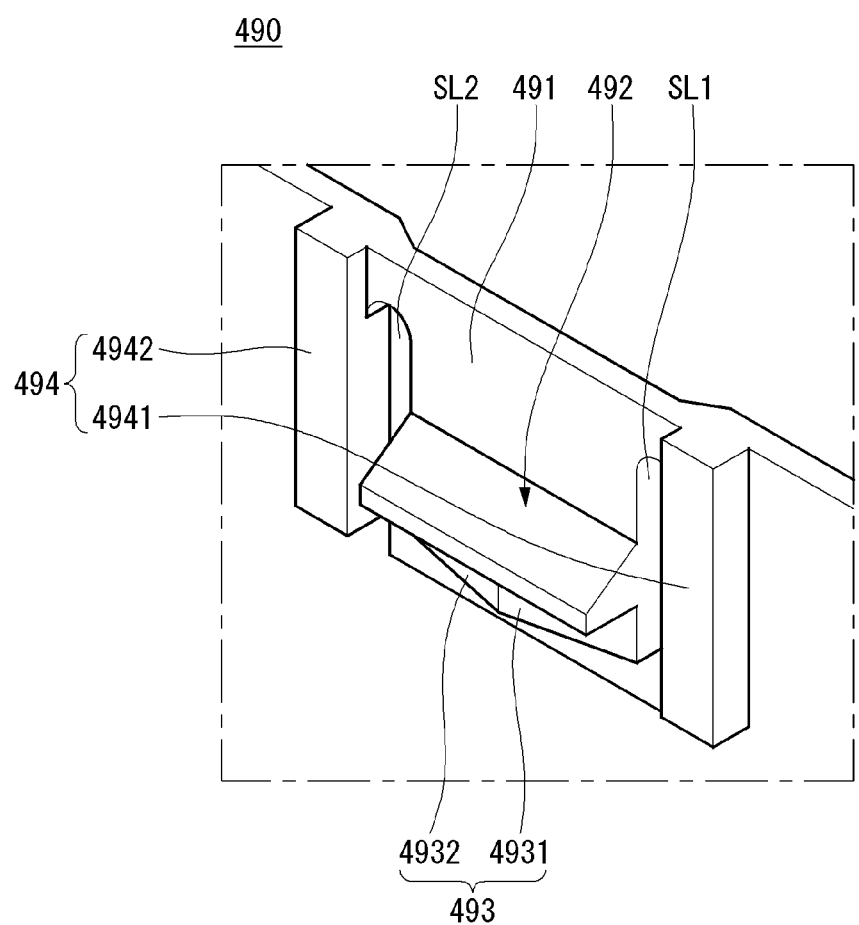

Referring to FIGS. 16, 17 and 23, the guide panel 400 may include a coupling unit 490. The coupling unit 490 may include an elastic portion 491, a projection 492, a pressing portion 493, a rib 494, and slits SL1 and SL2. The elastic portion 491 may be a part of the vertical portion 440 of the guide panel 400. The plurality of slits SL1 and SL2 may be formed at the vertical portion 440. The first slit SL1 and the second slit SL2 may pass through the inner surface and the outer surface of the vertical portion 440. The second slit SL2 may be disposed in parallel with the first slit SL1. The second slit SL2 may be spaced apart from the first slit SL1. The elastic portion 491 can be elastic.

The projection 492 may protrude from the outer surface of the elastic portion 491. The projection 492 may be extended from the elastic portion 491. The projection 492 may be positioned between the first slit SL1 and the second slit SL2. The projection 492 may have an engagement surface 492H and a guide surface 492G. The engagement surface 492H may be substantially perpendicular to the elastic portion 491. The guide surface 492G can connect the engagement surface 492H and the outer surface of the elastic portion 491. The guide surface 492G may be inclined with respect to the elastic portion 491. The inclination of the guide surface 492G may be smaller than the inclination of the engagement surface 492H.

The pressing portion 493 may be formed adjacent to the engagement surface 492H on the elastic portion 491. The first slit SL1 can meet with the second slit SL2 while surrounding the pressing portion 493. The projection 492 can be positioned between the elastic portion 491 and the pressing portion 493. The first slit SL1 can be communicated to the second slit SL2. The first slit SL1 and the second slit SL2 may be formed around the elastic portion 491. For example, overall shape of the first slit SL1 and the second slit SL2 may be U-shape. For example, the first slit SL1 and the second slit SL2 may surround at least a portion of the elastic portion 491.

The rib 494 may be a bar or a column projecting from the outer surface of the guide panel 400. The rib 494 may have a first rib 4941 and a second rib 4942. The first rib 4941 may be formed adjacent to the first slit SL1 and in parallel with the first slit SL1. The first slit SL1 may be formed between the first rib 4941 and the elastic portion 491. The second rib 4942 may be formed adjacent to the second slit SL2 and in parallel with the second slit SL2. The second slit SL2 may be formed between the second rib 4942 and the elastic portion 491.

Figure 18:
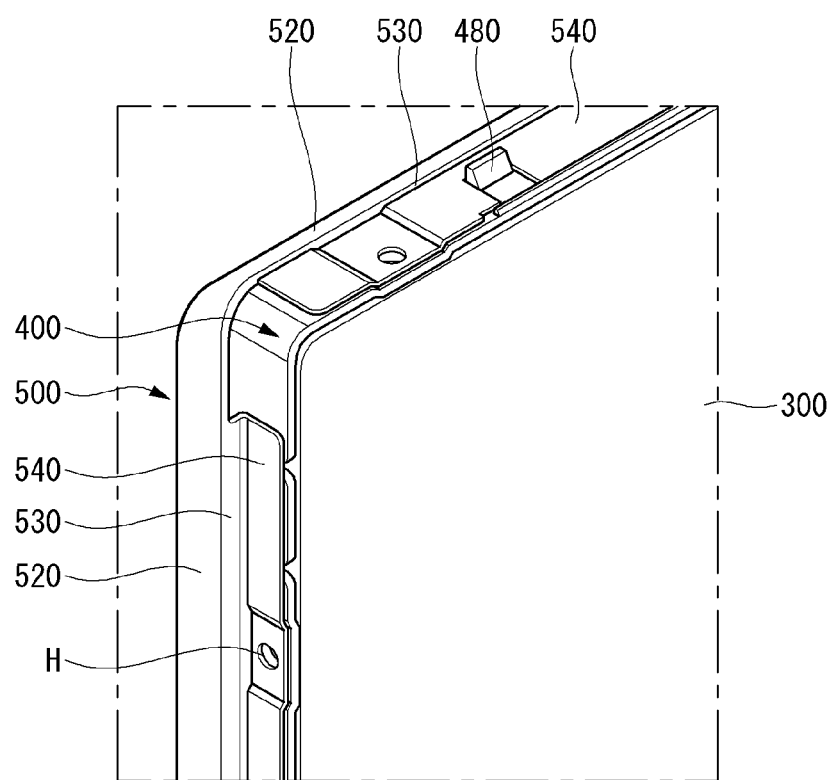

Referring to FIG. 18, the front cover 500 may be coupled with the guide panel 400 and/or the frame 300. The fourth part 540 of the front cover 500 may have a hole H. The guide panel 400 and/or the frame 300 may have holes H corresponding to the holes H of the fourth part 540. When the screw is fastened to the hole H, the front cover 500, the guide panel 400, and/or the frame 300 can be coupled to one another. That is, the front cover 500 and the guide panel 400 can be screw-fastened to the frame 300.

Figure 19:
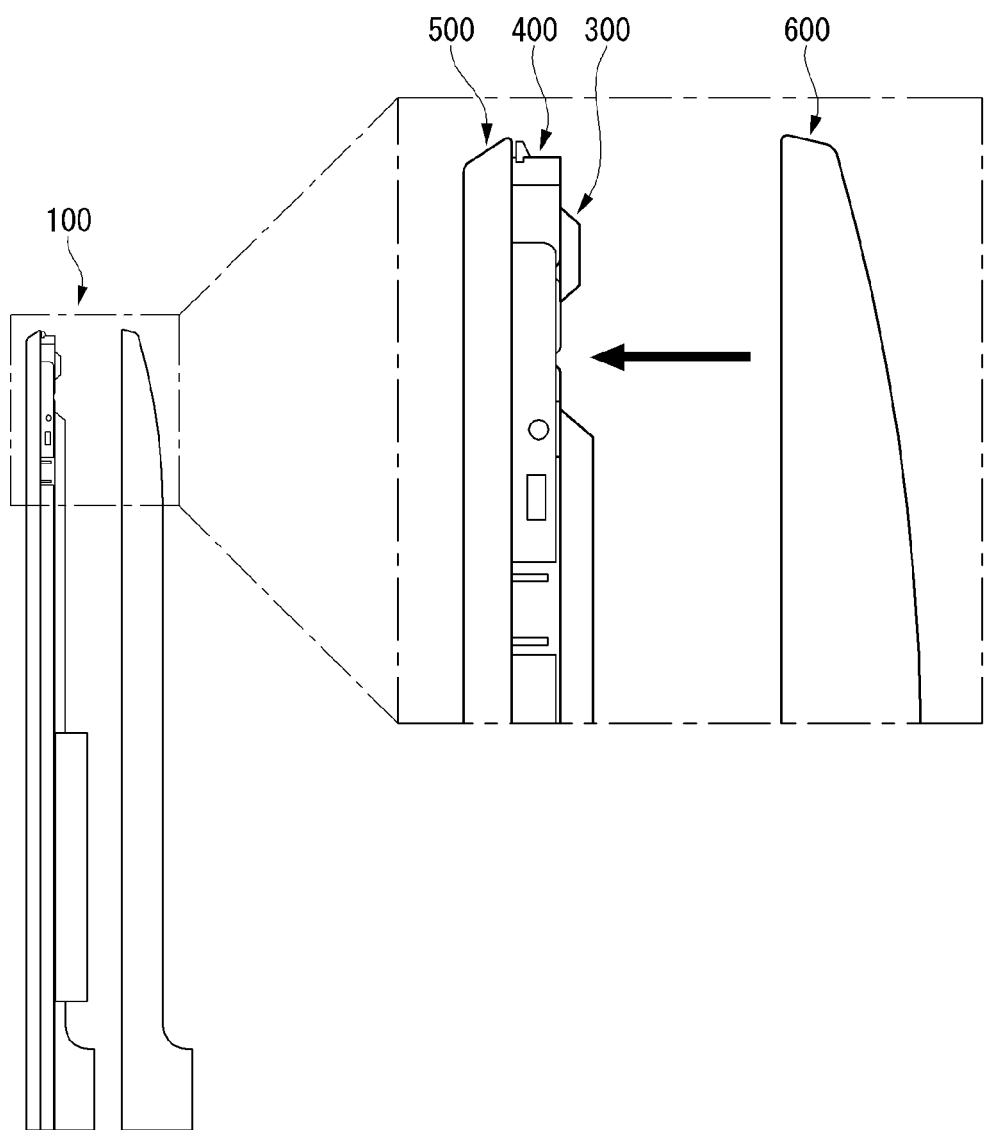
Figure 20:
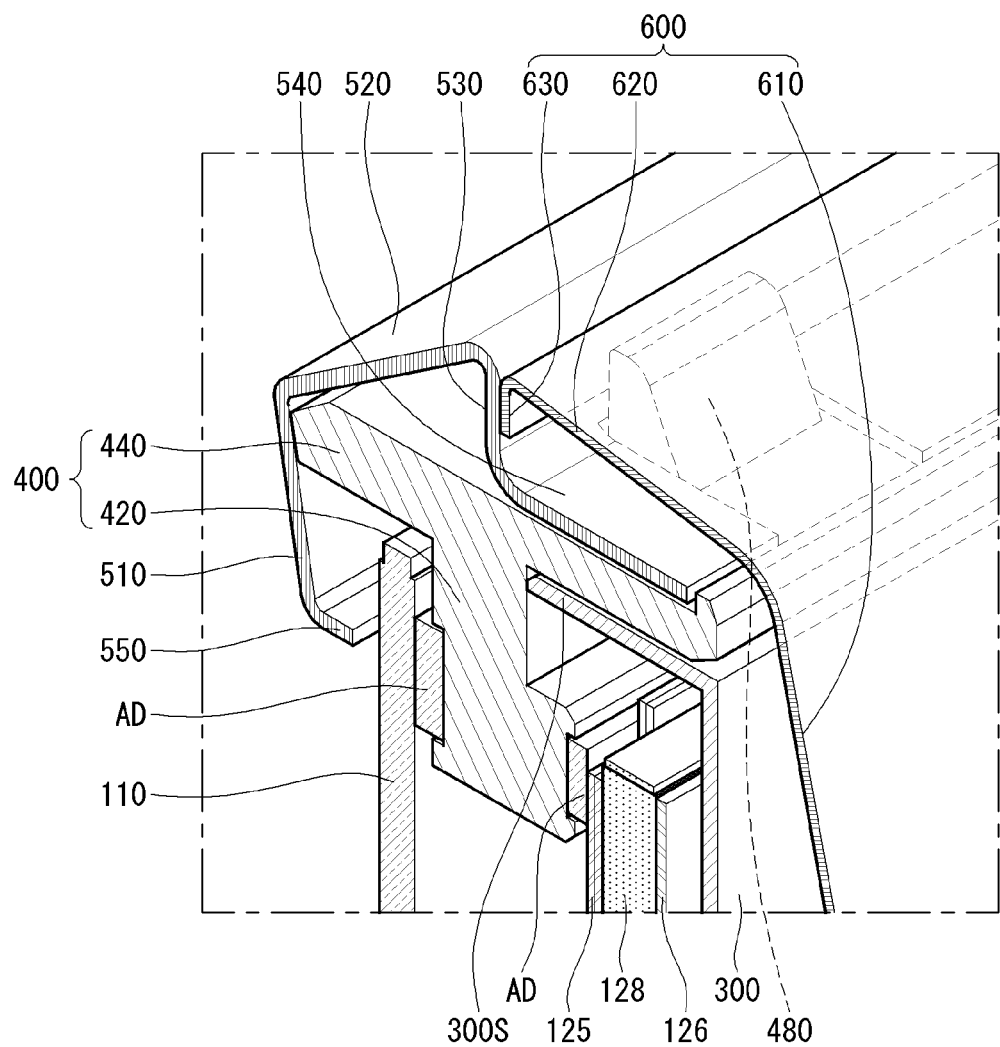
FIGS. 20 to 29 are views illustrating examples of the display device according to an embodiment of the present invention.
Figure 21:
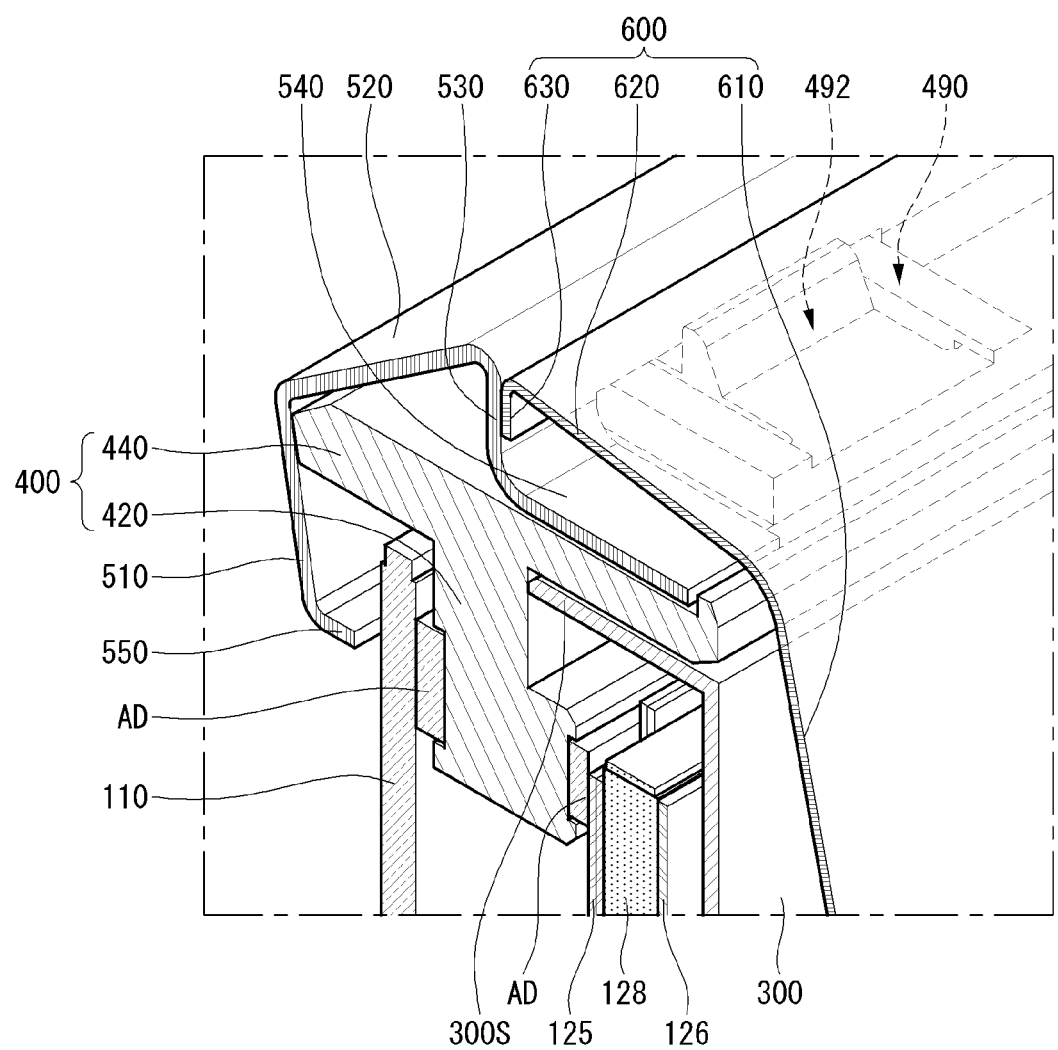

Referring to FIGS. 19 to 21, the back cover 600 may be coupled to the frame 300 while covering the rear surface of the frame 300. The back cover 600 may have a back plate 610, a sidewall 620, and a hooking portion 630. The back plate 610 may cover the rear surface of the frame 300. The sidewall 620 may extend from the back plate 610. The sidewall 620 may be bent toward the frame 300 or the front of the back cover 600. The sidewall 620 may cover the fourth part 540 of the front cover 500.

The hooking portion 630 can be bent from the sidewall 620 toward the fourth part 540 of the front cover 500. The hooking portion 630 may face or be in contact with the third part 530 of the front cover 500. The back cover 600 may comprise a metal. The back cover 600 may have elasticity. The hooking portion 630 can be engaged with the fixing protrusion 480. The hooking portion 630 can be engaged with the projection 492 of the coupling unit 490.

Figure 22:
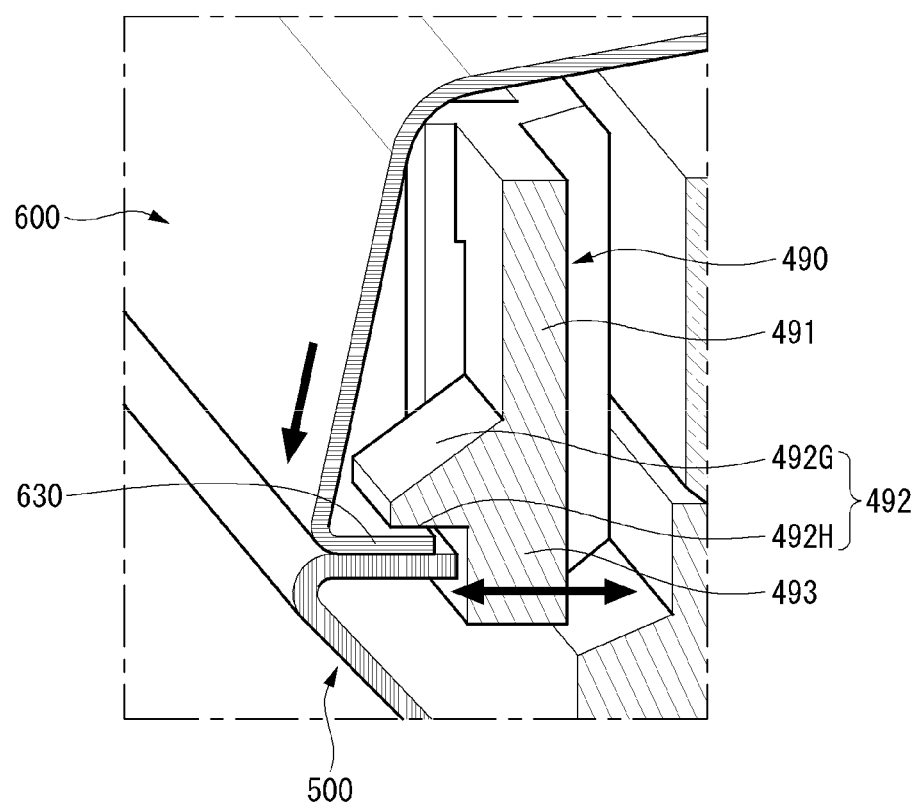

Referring to FIG. 22, when the back cover 600 is fitted in the coupling unit 490, the elastic portion 491 can pivot. The pressing portion 493 can form the maximum stroke of the pivotal motion. The hooking portion 630 of the back cover 600 can move along the guide surface 492G of the projection 492 of the coupling unit 490, when the back cover 600 moves forward from the rear side. At this time, the projection 492 can be pressed by the hooking portion 630 of the back cover 600. When the hooking portion 630 of the back cover 600 moves from the guide surface 492G to the engagement surface 492H, the hooking portion 630 can face and be coupled to the engagement surface 492H. The pressing portion 493 can be convex toward the hooking portion 630.

Figure 24:
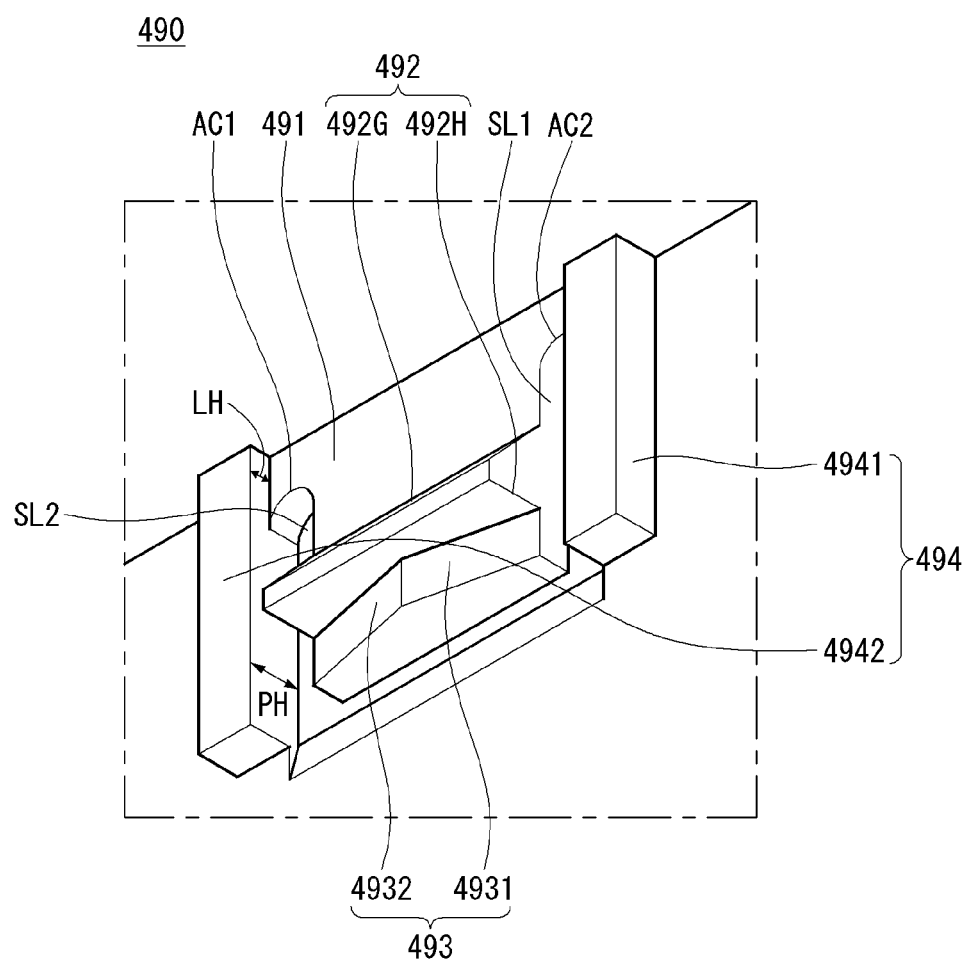

Referring to FIGS. 23 and 24, the ribs 494 can form a step with respect to the plane of the elastic portion 491. The height of the rib 494 may be lower than the height of the engagement surface 492H. The difference between the height PH of the engagement surface 492H and the height LH of the ribs 4941 and 4942 can be corresponding to the amount of engagement of the hooking portion 630. The first slit SL1 may be formed adjacent to the first rib 4941. The first slit SL1 may have an arch portion AC1 at one end. The second slit SL2 may be formed adjacent to the second rib 4942. The second slit SL2 may have an arch portion AC2 at one end. The arch portions AC1 and AC2 can prevent cracks that may occur at the elastic portion 491.

The pressing portion 493 may include a first inclined surface 4931 and a second inclined surface 4932. The first inclined surface 4931 may be symmetrical with the second inclined surface 4932. The first inclined surface 4931 can meet the second inclined surface 4932 at the center of the pressing portion 493. The first inclined surface 4931 and the second inclined surface 4932 may be convexly formed as a whole.

Figure 25:
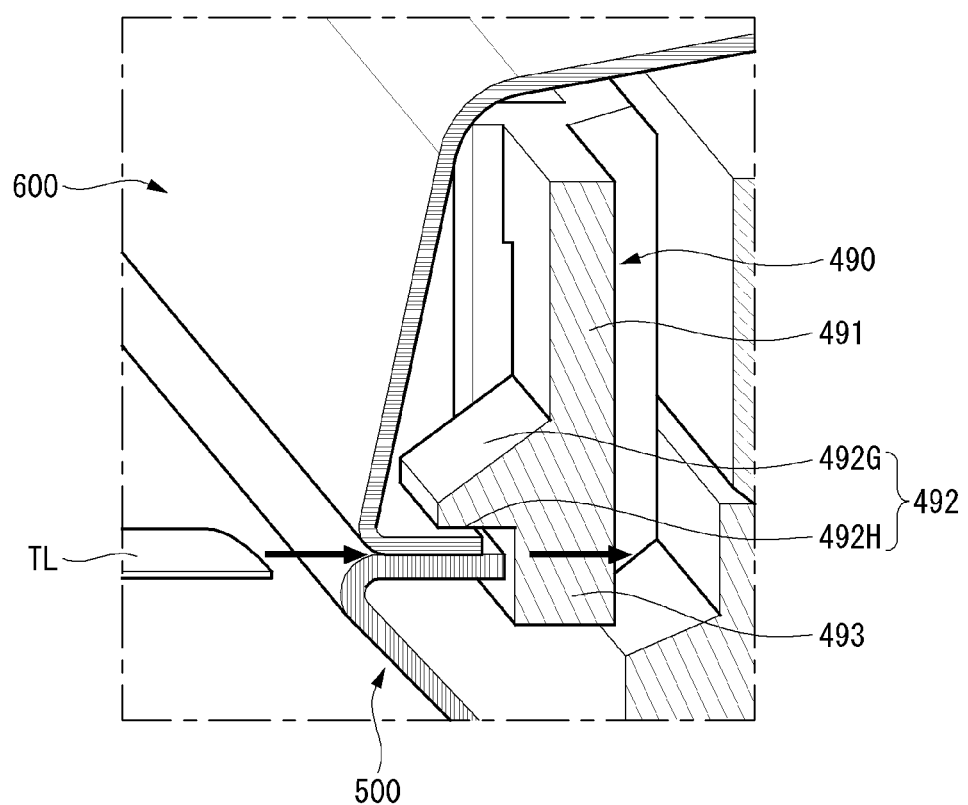

Referring to FIG. 25, a tool TL may be inserted between the back cover 600 and the front cover 500 in order to detach the back cover 600 from the frame 300. The tool TL may be in the form of a thin knife. As the tool TL is inserted, a gap may occur between the front cover 500 and/or the back cover 600. The tool TL can go toward the coupling unit 490 through the gap. When the tool TL approach the coupling unit 490, the tool TL can press the pressing portion 493 of the coupling unit 490. As a result, a stroke may occur at the elastic portion 491 and/or the pressing portion 493.

Figure 26:
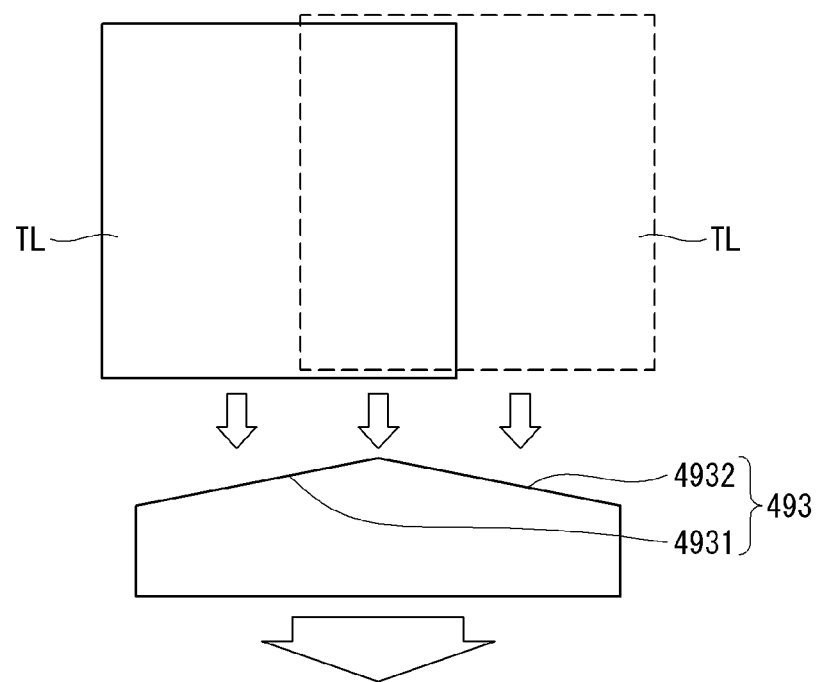

Referring to FIG. 26, the position of the tool TL inserted into the gap between the back cover 600 and the front cover 500 may not be constant, or the position of the pressing portion 493 on which the tool TL have a press may not be constant. Despite the uncertain position of the tool TL, the pressing portion 493 can be pressed with a constant stroke. That is, the tool TL can press the pressing portion 493 in a predetermined direction by the first inclined surface 4931 and the second inclined surface 4932 of the pressing portion 493. The stroke of the elastic portion 491 and/or the pressing portion 493 may be substantially constant because the center of the pressing portion 493 is pressed, regardless of the uncertain position of the tool TL. The maximum stroke of the pressing portion 493 may correspond to the maximum amount of engagement of the hooking portion 630 of the back cover 600.

Figure 27:
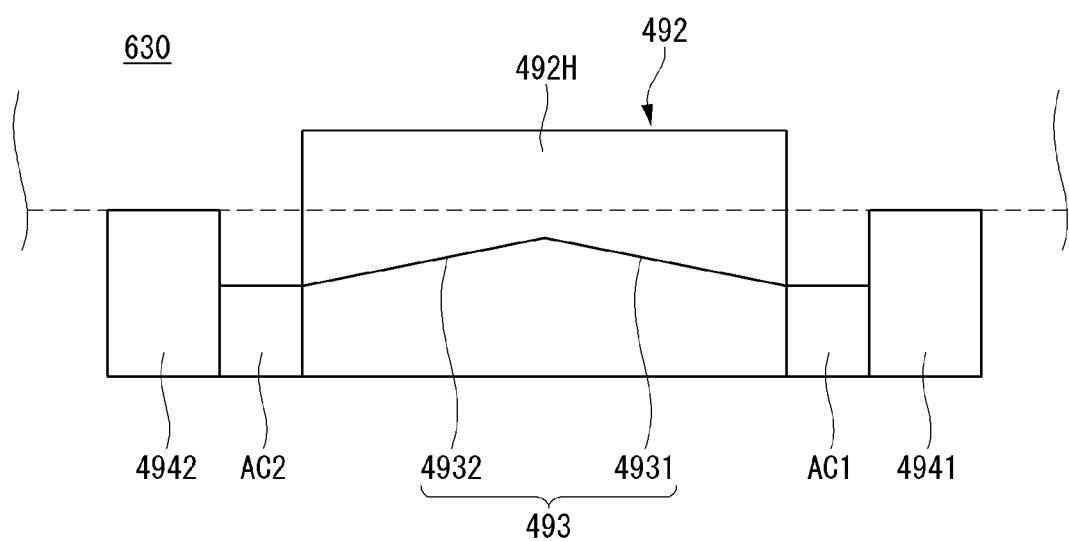

Referring to FIG. 27, the hooking portion 630 of the back cover 600 can be supported by the ribs 4941 and 4942 of the coupling unit 490. The hooking portion 630 of the back cover 600 can be inserted toward the pressing portion 493 of the coupling unit 490, which can mean that the maximum insertion position can be limited by the ribs 4941 and 4942. Therefore the overlapping range of the hooking portion 630 of the back cover 600 and the engagement surface 492H of the coupling unit 490 can be constant. The overlapping range may mean the amount of engagement of the hooking portion 630 of the back cover 600 and the engagement surface 492H of the coupling unit 490. When the tool TL presses the pressing portion 493, the stroke of the pressing portion 493 can reach the maximum. When the stroke of the pressing portion 493 reach the maximum, the hooking portion 630 can be decoupled from the engagement surface 492H of the coupling unit 490. Thus, the back cover 600 can be easily separated from the frame 300. The maximum stroke of the pressing portion 493 may mean a critical stroke at which the engagement surface 492H of the coupling unit 490 is decoupled from the hooking portion 630.

The back cover 600 may include a metal formed by press working. In this case, in the conventional display device product, the back cover 600 can be deformed when the back cover 600 may be detached. However, the coupling unit 490 according to an embodiment of the present invention can prevent deformation of the back cover 600, which may occur in the conventional product.

Figure 28:
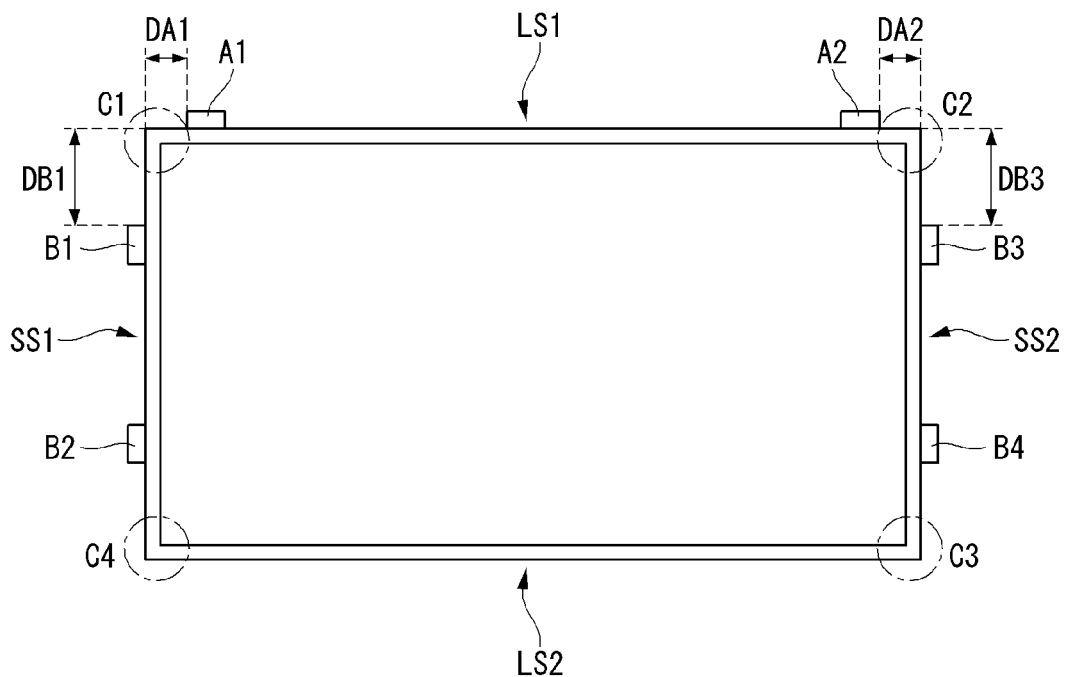

Referring to FIG. 28, the fixing protrusions 480, A1, and A2 may be positioned on the first long side LS1 of the guide panel 400. The coupling units 490, B1 to B4 may be located at the first short side SS1 and/or the second short side SS2 of the guide panel 400. The plurality of coupling units 490, B1 to B4 may be located at the first short side SS1 and/or the second short side SS2 of the guide panel 400.

The first fixing protrusions 480, A1 may be positioned on the first long side LS1 of the guide panel 400, be positioned adjacent to the first corner C1. The first coupling unit 490, B1 may be located on the first short side SS1 of the guide panel 400, be positioned adjacent to the first corner C1. The distance DA1 from the first corner C1 to the first fixing protrusion 480 may be smaller than the distance DB1 from the first corner C1 to the first coupling unit 490, B1.

The second fixing protrusions 480, A2 may be positioned on the first long side LS1 of the guide panel 400, may be positioned adjacent to the second corner C2. The third coupling unit 490, B3 may be located on the second short side SS2 of the guide panel 400, may be positioned adjacent to the second corner C2. The distance DA2 from the second corner C2 to the second fixing protrusion 480, A2 may be smaller than the distance DB3 from the second corner C2 to the third coupling unit 490, B3.

The second coupling unit 490, B2 may be positioned between the first coupling unit 490, B1 and the fourth corner C4, may be positioned on the first short side SS1. The fourth coupling unit 490, B4 may be located between the third coupling unit 490, B3 and the third corner C3, may be positioned on the second short side SS2.

The separation of the back cover 600 can be facilitated more, when the first coupling unit 490, B1 becomes away from the first corner C1. The separation of the back cover 600 can be facilitated more, when the third coupling unit 490, B3 becomes away from the second corner C2. The structural stability of the coupling of the back cover 600 can be secured more, when the first fixing protrusion 480, A1 becomes close to the first corner C1. The structural stability of the coupling of the back cover 600 can be secured more, when the second fixing protrusion 480, A2 becomes close to the second corner C2.

The fixing protrusions 480, A1, A2 can be set corresponding to the positions of the coupling units 490, B1 to B4. The coupling units 490, B1 to B4 can be set corresponding to the positions of the fixing projections 480, A1, A2.

Figure 29:
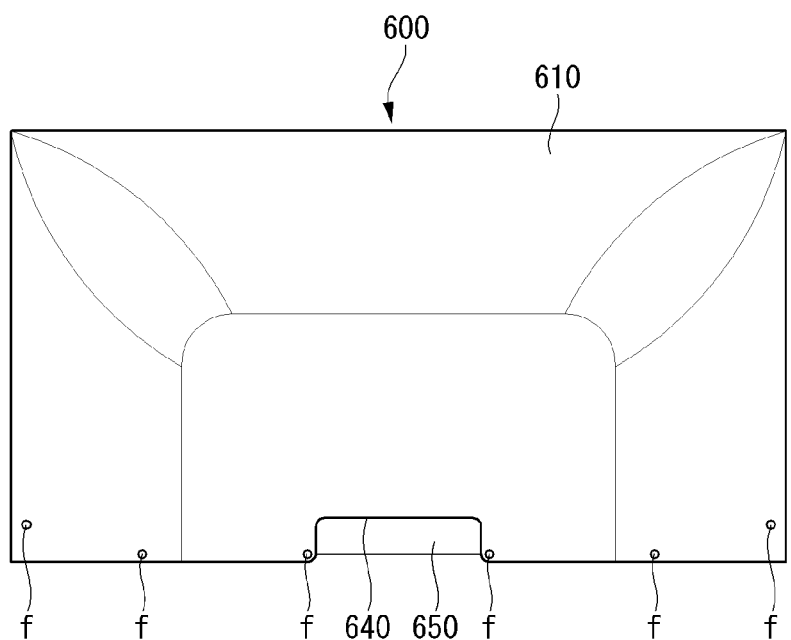

Referring to FIG. 29, the back cover 600 may have an opening 640. The opening 640 may be formed at the back plate 610 of the back cover 600. The opening 640 may be formed at the lower central region of the back cover 600. The auxiliary cover 650 may cover the opening 640. The back cover 600 may include a metal. The auxiliary cover 650 may include a synthetic resin. A wireless communication unit (not shown) may be positioned between the frame 300 (see FIG. 21) and the auxiliary cover 650. For example, the wireless communication unit (not shown) may be a Wi-Fi receiver.

The back cover 600 can be fixed to the frame 300 (see FIG. 21) by the fastening member f. The fastening member f can be fastened to the back cover 600, along the lower edge of the back cover 600.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
   a display panel;
   a frame being positioned at a rear of the display panel;
   a guide panel including a receiving portion on which a rear surface of the display panel is received, and a guide wall connected to the receiving portion and contacting the frame; and
   a back cover positioned behind the frame and including a hooking portion,
   wherein the guide wall includes a coupling unit positioned at the guide wall, wherein the coupling unit includes:
   a first slit;
   a second slit opposite to the first slit;
   an elastic portion positioned between the first slit and the second slit;
   a pressing portion positioned between the first slit and the second slit, wherein the pressing portion is convex toward the hooking portion of the back cover; and
   a projection formed between the first slit and the second slit, and
   wherein the back cover is engaged with the projection.

2. The display device of claim 1,
   wherein the projection is positioned between the elastic portion and the pressing portion.

3. The display device of claim 2, wherein the first slit and the second slit are connected to each other and
   surround the pressing portion.

4. The display device of claim 2, wherein the projection includes:
   a guide surface being inclined with respect to the pressing portion; and
   an engagement surface being positioned between the guide surface and the pressing portion, the engagement surface being extended from the guide surface to the pressing portion.

5. The display device of claim 4, wherein the back cover further includes:
   a back plate facing a rear surface of the frame; and
   a sidewall being bent and extended from the back plate toward the display panel, the sidewall covering the guide wall of the guide panel;
   wherein the hooking portion is bent and extended from the sidewall toward the pressing portion, and is engaged with the engagement surface of the projection.

6. The display device of claim 4, further comprising a front cover which covers an edge of the display panel,
   wherein the front cover includes:
   a first part covering an edge of a front surface of the display panel, the front part being supported by the guide wall of the guide panel;
   a second part being bent and extended from the first part, the second part covering the outer surface of the guide wall of the guide panel, the second part being spaced apart from the guide wall of the guide panel;
   a third part being extended from the second part toward the guide wall of the guide panel; and
   a fourth part being extended from the third part, the fourth part facing the guide wall of the guide panel,
   wherein the fourth part includes an opening, and
   wherein the coupling unit is fitted in the opening.

7. The display device of claim 6, wherein the back cover further includes:
   a back plate facing a rear surface of the frame;
   a sidewall being bent and extended from the back plate toward the display panel, the sidewall covering the guide wall of the guide panel;
   wherein the hooking portion is bent and extended from the sidewall toward the pressing portion, and is engaged with the engagement surface of the projection, and
   wherein the hooking portion faces the third part.

8. The display device of claim 6, wherein the front cover and the guide panel are screw-fastened to the frame.

9. The display device of claim 2, wherein the coupling unit further include a rib being positioned adjacent to at least one of the first slit and the second slit, wherein the rib protrudes at the guide wall of the guide panel.

10. The display device of claim 9, wherein a height of the rib is smaller than a height of the projection.

11. The display device of claim 9, wherein the rib includes a plurality of ribs, and wherein each of the plurality of ribs is positioned adjacent to each of the first slit and the second slit.

12. The display device of claim 2, wherein an arch portion is formed at an end of at least one of the first slit and the second slit.

13. The display device of claim 2, wherein the guide panel includes:
   a first long side;
   a second long side being opposite to the first long side;
   a first short side being connected to an end of the first long side, the first short side being connected to an end of the second long side; and
   a second short side being opposite to the first short side, the second short side being connected to another end of the first long side, the second short side being connected to another end of the second long side,
   wherein the coupling unit is positioned on the first short side, and
   wherein the guide panel includes a fixing protrusion positioned on the first long side.

14. The display device of claim 13, wherein the coupling unit is positioned adjacent to a first corner, wherein the first long side is connected to the first short side at the first corner, wherein the fixing protrusion is positioned adjacent to the first corner, and wherein a distance from the fixing protrusion to the first corner is smaller than a distance from the coupling unit to the first corner.

15. The display device of claim 2, wherein the back cover contains a metal.

\* \* \* \* \*